United States Patent
Ronin et al.

(10) Patent No.: US 11,539,669 B2
(45) Date of Patent: *Dec. 27, 2022

(54) INSPECTION OF NETWORK PACKET TRAFFIC FOR POLICY CONTROL

(71) Applicant: Netskope, Inc., Santa Clara, CA (US)

(72) Inventors: Victor Ronin, San Francisco, CA (US); David Goldschlag, Silver Spring, MD (US); Vadim Tarnavsky, San Jose, CA (US); Kevin Eugene Sapp, St. Augustine, FL (US)

(73) Assignee: Netskope, Inc., Santa Clara, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/163,025

(22) Filed: Jan. 29, 2021

(65) Prior Publication Data

US 2021/0185016 A1 Jun. 17, 2021

Related U.S. Application Data

(60) Continuation of application No. 16/922,561, filed on Jul. 7, 2020, now Pat. No. 11,329,958, which is a
(Continued)

(51) Int. Cl.
*H04L 9/40* (2022.01)
*H04L 61/4511* (2022.01)
(Continued)

(52) U.S. Cl.
CPC ...... *H04L 63/0272* (2013.01); *H04L 61/4511* (2022.05); *H04L 63/029* (2013.01);
(Continued)

(58) Field of Classification Search
USPC .......... 726/2, 13, 21, 36; 713/150, 163, 181; 380/255, 264, 276
See application file for complete search history.

(56) References Cited

U.S. PATENT DOCUMENTS

| | | | |
|---|---|---|---|
| 7,664,879 B2 * | 2/2010 | Chan | H04L 67/14 711/113 |
| 7,725,934 B2 * | 5/2010 | Kumar | H04L 63/0245 713/188 |

(Continued)

FOREIGN PATENT DOCUMENTS

| | | |
|---|---|---|
| CN | 1855847 A | 11/2006 |
| CN | 101981887 A | 2/2016 |
| WO | 2002037730 A2 | 5/2002 |

*Primary Examiner* — Sharif E Ullah
(74) *Attorney, Agent, or Firm* — Kilpatrick Townsend & Stockton, LLP

(57) ABSTRACT

Systems and methods for providing policy-controlled communication over the Internet are provided. A system may include a client endpoint function configured to execute on a client device while coupled to a first VPN tunnel, a service endpoint function that operates a remote service of a plurality of remote services, and a mid-link server coupled to the first VPN tunnel and a second VPN tunnel. The mid-link server may include an inspection component that analyzes network packet traffic in accordance with a plurality of policies. The inspection component may inspect the network packet traffic for specific content and provide instructions to a router component and/or a mediation component of the mid-link server. The instructions may be a function of at least one policy that applies to the specific content.

20 Claims, 8 Drawing Sheets

Related U.S. Application Data division of application No. 16/602,698, filed on Nov. 20, 2019, now Pat. No. 10,771,435.

(60) Provisional application No. 62/769,820, filed on Nov. 20, 2018.

(51) Int. Cl.
   *H04L 67/53* (2022.01)
   *H04L 67/563* (2022.01)

(52) U.S. Cl.
   CPC ...... *H04L 63/0236* (2013.01); *H04L 63/0478* (2013.01); *H04L 67/53* (2022.05); *H04L 67/563* (2022.05)

(56) References Cited

U.S. PATENT DOCUMENTS

| | | | | |
|---|---|---|---|---|
| 7,962,582 B2* | 6/2011 | Potti | ...................... | H04L 45/563 370/400 |
| 8,010,085 B2* | 8/2011 | Apte | ...................... | G06F 21/577 709/227 |
| 8,464,335 B1* | 6/2013 | Sinha | ...................... | G06F 21/51 713/153 |
| 8,639,837 B2* | 1/2014 | Li | ...................... | H04L 47/20 709/236 |
| 8,656,154 B1* | 2/2014 | Kailash | ...................... | H04L 63/0807 713/168 |
| 8,661,505 B2* | 2/2014 | Kougiouris | ...................... | H04L 63/20 726/4 |
| 8,819,809 B2* | 8/2014 | Mullick | ...................... | H04L 63/10 726/14 |
| 8,869,259 B1* | 10/2014 | Udupa | ...................... | H04L 63/20 726/10 |
| 8,869,262 B2* | 10/2014 | Mullick | ...................... | H04L 63/0876 709/227 |
| 8,955,091 B2* | 2/2015 | Kailash | ...................... | H04L 63/1425 726/11 |
| 9,065,800 B2* | 6/2015 | Devarajan | ...................... | G06F 21/56 |
| 9,100,424 B1* | 8/2015 | Thomas | ...................... | H04L 69/16 |
| 9,258,329 B2* | 2/2016 | Narayanaswamy | ...................... | H04L 63/0245 |
| 9,344,393 B2* | 5/2016 | Boynton | ...................... | H04L 63/0272 |
| 9,531,758 B2* | 12/2016 | Devarajan | ...................... | H04L 63/20 |
| 9,634,943 B2* | 4/2017 | Jungck | ...................... | H04L 41/5054 |
| 9,654,507 B2* | 5/2017 | Gangadharappa | ...................... | H04L 63/20 |
| 9,660,998 B1* | 5/2017 | Sethi | ...................... | H04L 63/08 |
| 9,825,909 B2* | 11/2017 | Ardeli | ...................... | H04L 63/0227 |
| 9,882,767 B1* | 1/2018 | Foxhoven | ...................... | H04L 61/4552 |
| 9,935,955 B2* | 4/2018 | Desai | ...................... | H04L 67/02 |
| 10,044,719 B2* | 8/2018 | Desai | ...................... | H04L 63/20 |
| 10,142,362 B2* | 11/2018 | Weith | ...................... | H04L 63/20 |
| 10,333,988 B2* | 6/2019 | Porras | ...................... | H04L 63/107 |
| 10,659,450 B2* | 5/2020 | Sridhar | ...................... | H04L 9/3247 |
| 2003/0028616 A1* | 2/2003 | Aoki | ...................... | H04L 67/568 709/217 |
| 2005/0198351 A1* | 9/2005 | Nog | ...................... | H04L 67/63 709/238 |
| 2014/0259093 A1* | 9/2014 | Narayanaswamy | ...................... | H04L 63/0281 726/1 |
| 2015/0012664 A1* | 1/2015 | Johnson | ...................... | H04L 45/72 709/238 |
| 2016/0359807 A1* | 12/2016 | Buruganahalli | ...................... | H04L 63/1408 |
| 2018/0309795 A1* | 10/2018 | Ithal | ...................... | H04L 63/1425 |
| 2020/0067989 A1* | 2/2020 | Walter | ...................... | H04L 63/10 |

* cited by examiner

Client

Device/User/App Check

Server

INSPECTION OF NETWORK PACKET TRAFFIC FOR POLICY CONTROL

CROSS-REFERENCE TO RELATED APPLICATIONS

This application is a continuation of U.S. patent application Ser. No. 16/922,561, filed Jul. 7, 2020, entitled "MID-LINK POLICY-CONTROLLED INTERNET COMMUNICATION," which is a divisional of U.S. patent application Ser. No. 16/602,698, filed Nov. 20, 2019, entitled "ZERO TRUST AND ZERO KNOWLEDGE APPLICATION ACCESS SYSTEM, now U.S. Pat. No. 10,771,435, which claims the benefit of priority to U.S. Provisional Patent Application No. 62/769,820, filed Nov. 20, 2018, entitled "ZERO TRUST AND ZERO KNOWLEDGE APPLICATION ACCESS SYSTEM," the contents of which are hereby incorporated by reference in their entireties for all purposes.

This application is related to U.S. patent application Ser. No. 17/163,019, entitled "MID-LINK SERVER HAVING A PLURALITY OF ACCESS RESOURCE SERVERS FOR POLICY CONTROL,", and to U.S. patent application Ser. No. 17/163,030, entitled "POLICY-CONTROLLED AUTHENTICATION FOR INTERNET COMMUNICATION,", both filed on Jan. 29, 2021, the contents of which are hereby incorporated by reference in their entireties for all purposes.

COPYRIGHT NOTICE

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright NewEdge© 2018, 2019.

BACKGROUND OF THE TECHNOLOGY

2.1 Field of the Technology

The described system and methods of operation provides zero-trust and zero-knowledge access between mobile and other computing devices and enterprise services without exposing configuration and authentication information about the enterprise services and client resources, removing denial of service risks, and minimizing attack surfaces of the enterprise services on the network.

The exemplary, illustrative, technology herein relates to systems, software, and methods for protecting infrastructure systems from cyberattack. The technology herein has applications in the areas of information security, configuration management, and application deployment.

2.2 The Related Art

A persistent problem in today's Internet architecture, and in particular, today's cloud and hybrid system architectures, is that the systems require predefined trusted information be distributed between the various devices and services that make up the overall systems architecture. This distributed information, and the related enforcement system components, is subject to exposure and attack by malicious parties.

FIG. 1 illustrates the current direct connect method used by prior art systems, where a client computer connects via the internet (typically over a VPN) to a firewall protecting a first enterprise service. The client computer validates itself to the firewall and security apparatus protecting the first enterprise service, and then authenticates the user to the first enterprise service. Once authenticated, the client and the enterprise service communicate freely. The client computer repeats these steps in order to connect with a second enterprise service, where the second enterprise service protection systems are typically different than the first enterprise service protection system and the requirements imposed on the client computer typically also differ. In some cases, the requirements imposed by the two enterprise resource systems are mutually exclusive, preventing the client computer from connecting to one or the other of the enterprise services.

In existing traditional computing architectures, information regarding aspects of the enterprise service topology and configuration are, by necessity, provided to client computers that need to connect to the enterprise service(s). This information exposes aspects about the configuration of these enterprise resources, which is used by malicious third parties to craft attacks against the enterprise resources, designed to uncover additional information and eventually exploit a weakness in the security configurations.

Furthermore, the conventional system requires that individual client devices and users must be authenticatable and are trusted by each enterprise resource individually. This exposes client device configuration details to the enterprise resources, including potential leakage about other applications and configuration information on the client. Requiring each client device to connect individually to enterprise resources create creates additional challenges when devices and users connect to disparate enterprise resources. For example, the security software required by each of the enterprise resources may be incompatible from a policy specification and provision standpoint, as well as having conflicting technical aspects (such as requiring it be the sole provider of a particular service to a client). This also permits information leakages based upon the weakest required set of policies. In addition, existing mechanisms for providing the enterprise resources on a network necessarily expose the resources to attack from malicious parties. For example, enterprise services typically require open ports on the enterprise firewall that permit connection requests and internet traffic to reach the enterprise services from clients connected to the internet. These mechanisms must be protected at great expense. Furthermore, if the resources need to be moved in order to respond to a malicious attack such as a denial of service attack, the location of the resources cannot be moved easily, nor moved surreptitiously so the attacker is unaware that their target has been moved.

BRIEF DESCRIPTION OF THE DRAWINGS

The features of the present technology will best be understood from a detailed description of the technology and example embodiments thereof selected for the purposes of illustration and shown in the accompanying drawings in which.

In the appended figures, similar components and/or features may have the same reference label. Further, various components of the same type may be distinguished by following the reference label by a letter suffix that distinguishes among the similar components. If only the first reference label is used in the specification, the description is applicable to any one of the similar components having the same first reference label irrespective of letter suffix.

DESCRIPTION OF SOME EMBODIMENTS OF THE TECHNOLOGY

4.1 Overview

Current computing architectures on the internet are exposed to a myriad of threats and risks, and the mitigation of these threats and risks add technical complexity and unavoidably expose details about the computing architectures such that the details may be used by malicious attackers to attempt to inappropriately access one or more aspects of the computing architecture. Furthermore, the technical complexity of the solution increases geometrically as the number of endpoints in the computing architecture increase; thus a computing architecture that relies on a mobile endpoint connecting to three cloud services is significantly more complex than a mobile endpoint connecting to a single cloud service. With increased complexity comes interoperability challenges and multiple exposures of infrastructure components and their configuration information to malicious actors.

The Zero Trust and Zero Knowledge Application Access System addresses this growing complexity by providing an Access Resource Server (ARS), and in some implementations, a group of cooperating ARSs, that operate to separate and isolate the endpoints from each other and from external systems "in the wild" by:

A) requiring endpoints to initiate outbound connections from the endpoint to an ARS, B) moving most of the connection and session verification information to a secured ARS, C) consolidating policy enforcement and routing decisions from individual endpoints to an ARS, D) consolidating packet network packet traffic filtering and monitoring in an ARS, and E) protecting communications between endpoints with end-to-end encryption and with multiple levels of encryption.

Figure 1:
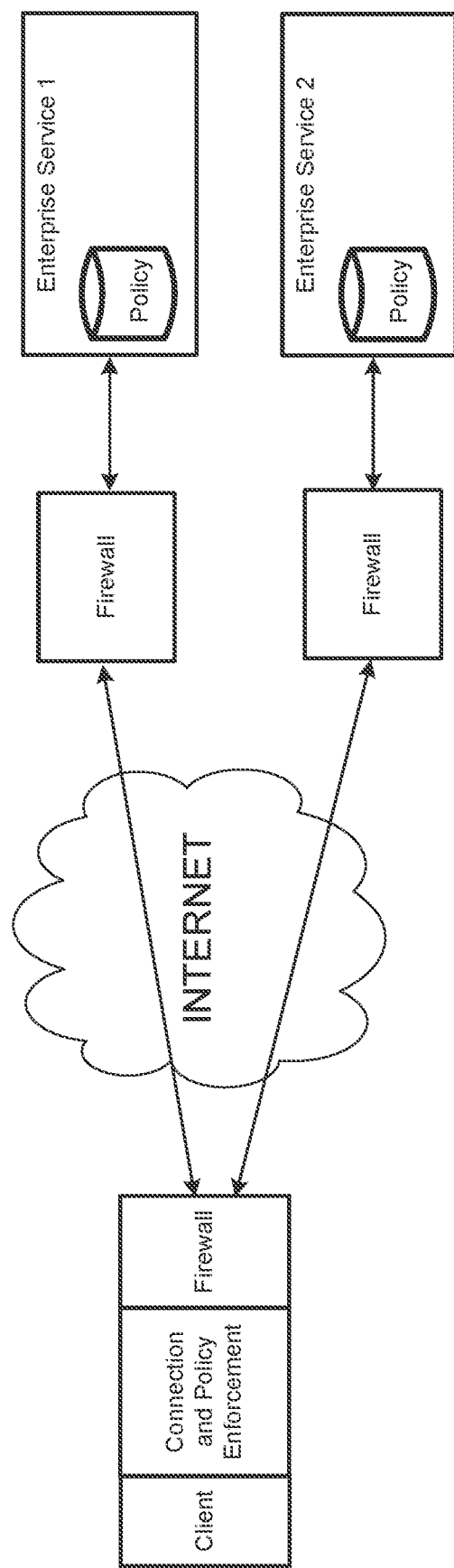
FIG. 1 illustrates a prior art method of connecting internet devices to enterprise services.
Figure 2:
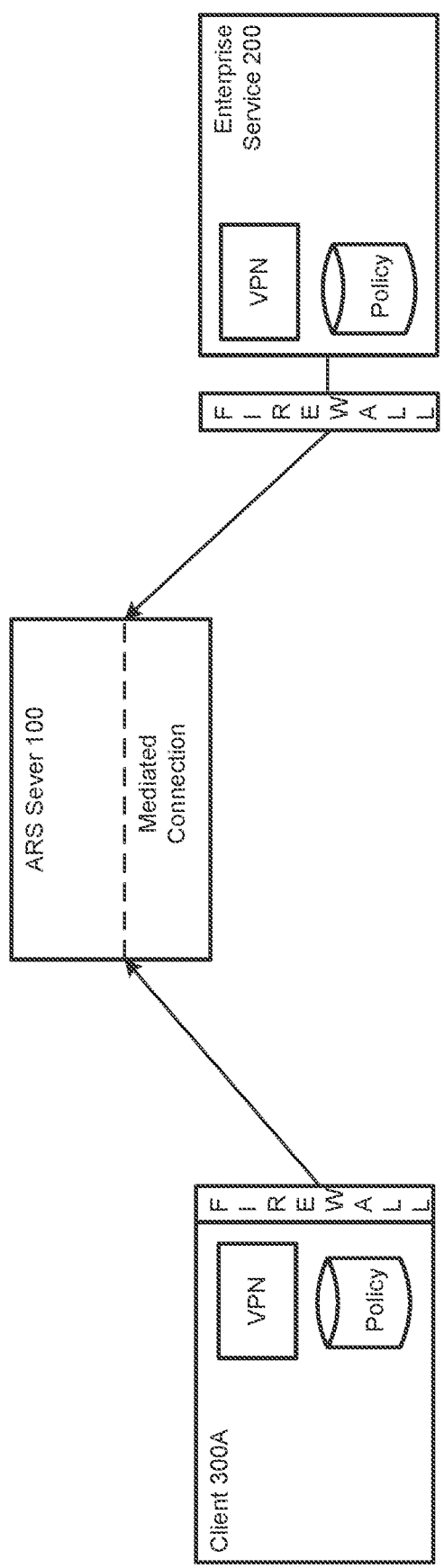
FIG. 2 illustrates a simplified architecture of the present technology that alleviates many of the technical issues of the prior art.

FIG. 2 illustrates an exemplary, simplified version of the Zero Trust and Zero Knowledge Application Access System, in which each of the source and destination endpoints connect outbound to a server on the network that provides the Zero Trust and Zero Knowledge system functionality. In the illustration, a client endpoint (300A), further comprising applications (not shown), a VPN component, a policy component, and an embedded firewall component, makes an outbound connection from the client device to an ARS (100) as illustrated by the connection arrow. Enterprise service endpoint (200), also comprising a VPN, a policy component, and a non-embedded firewall, also makes an outbound connection from the enterprise service endpoint to an ARS. In some implementations, the name and/or network address of the ARS is provided to the endpoint by a policy component such as a policy cache or policy store. In some implementations, the name provided is resolved using a directory service such as DNS. The firewall components serve to protect each of the client and enterprise service endpoints from inbound external connections by blocking those connection requests. The VPN component of each endpoint serves to encapsulate and protect the privacy and integrity (in accordance with a policy) of the network packet traffic between an endpoint and the ARS.

The ARS validates each inbound endpoint connection independently, and once validated, provides a network infrastructure layer to mediate and route the network packet traffic (e.g. the session) from a first endpoint to a second endpoint. Note that traffic may flow both directions between the endpoints. The mediation of the connection and session includes the steps of filtering, inspecting, and routing network packet traffic from a source endpoint to a destination endpoint. The ARS utilizes a number of techniques to mediate and inspect the network packet traffic and prevent detailed information about each of the connecting parties' configurations and locations from being exposed to the other endpoints. Inspection is performed by routing specific connection network packet traffic to specific inspection software components of the ARS, which perform in accordance with the applicable policy. Routing is implemented using standard network-based or IPC-based message/packet routing techniques.

This approach reduces the complexity of endpoint configurations by offloading most of the connection and endpoint validation, policy enforcement, information leakage management, and routing decisions from the endpoints to a common ARS. In addition, configuration information about the endpoints is no longer exposed to external systems because endpoint addresses are no longer publicly disclosed. This reduces the attack surface for endpoints by eliminating inbound network access to endpoints.

The described system further provides denial of service (DoS) and distributed denial of service (DDoS) attack mitigation, as well as protection against traffic monitoring analysis attacks by routing all outbound network packet traffic over a single encrypted connection, and providing for seamless rerouting of authenticated network packet traffic between ARSs. Thus a DoS/DDoS attack against a first ARS/destination endpoint results in the connected network packet traffic from client devices and enterprise services being automatically and seamlessly reconnected and rerouted via a second ARS. This rerouting occurs invisibly to external attackers, applications running on the client devices, and to the enterprise services, so the higher level application-to-service connections do not need to be re-created. This technique further improves security vs. traffic monitoring-based attacks by providing no visible change in the network packet traffic from an endpoint as connection and routings are changed. Lastly, this approach reduces the complexity of device and/or service endpoint connections by requiring only one endpoint connection (e.g. between an endpoint and an ARS) over which traffic to all other endpoints is multiplexed instead of requiring a plurality of differing connections to each of the many enterprise services. The single published interface to an ARS is able to be widely replicated, mitigating the effects of a DDoS attack against the infrastructure. In some implementations, the ARS is configured for fault tolerance and resistance against common forms of denial of service attacks.

The described approaches further provide a significant reduction in complexity that reduces the amount of endpoint configuration information that is available "in the wild," which, as a consequence, limits the type and number of available attack surfaces against either of the endpoints (client device or service endpoint).

In all, the Zero Trust and Zero Knowledge Application Access System provides substantial improvements to the configuration, information leakage, and service protection methods employed by current systems.

4.2 Definitions

The following definitions are used throughout, unless specifically indicated otherwise:

| TERM | DEFINITION |
| --- | --- |
| Endpoint | One of a client device and/or an enterprise service. |
| Endpoint, source | An endpoint that originates a connection to a destination endpoint. |
| Endpoint, destination | An endpoint that receives connections from a source endpoint |
| Mid-link server | An ARS or cluster of ARSs. |
| Network packet traffic | The flow to network packets on a network |
| Policy | A collection of policy elements, each defining or configuring an aspect of the system |
| Network session | A sequence of packets from a source endpoint to a destination endpoint. In some sessions, the flow is bidirectional (source endpoint to destination endpoint, and the reverse flow packets). |
| VPN | Virtual private network. A networking approach that provides protection for privacy of network packet traffic between a client and a server. |

4.3 Exemplary System Architecture

4.3.1 Overview

The described technology connects client devices and enterprise services (e.g. a source and destination endpoint) securely on a minimum knowledge basis, e.g. where each endpoint has minimum knowledge of the other endpoint's physical and logical configurations, or even the other endpoint's location or connection details. Thus, neither endpoint's configuration information is exposed in ways that it is exploitable by malicious attackers.

Furthermore, the exemplary technology reduces the level of trust-based processing required by the client device and enterprise services (collectively endpoints) by limiting the amount of information that each endpoint is required to manage about the systems they connect with. For example, the enterprise services are able to reduce the amount of trust-based processing (and the related infrastructure) required to support client devices connected to them because network packet traffic from the client device(s) has previously been endpoint verified, authenticated, and compliance checked by an ARS, and the network packet traffic from that client device has been inspected, filtered, and verified in accordance with the enterprise service's policies. The firewall-based network packet traffic inspection of inbound traffic at the endpoint is avoided and the risk of malicious traffic is substantially reduced. Furthermore, this configuration eliminates an attack surface for denial of service attacks against the endpoint firewall. The endpoint firewalls become a "black hole" that do not respond to network connection queries, blocking all inbound connection traffic. All of these benefits, when taken together, substantially reduce the complexity and cost of protecting an endpoint against external malicious network packet traffic.

Figure 3:
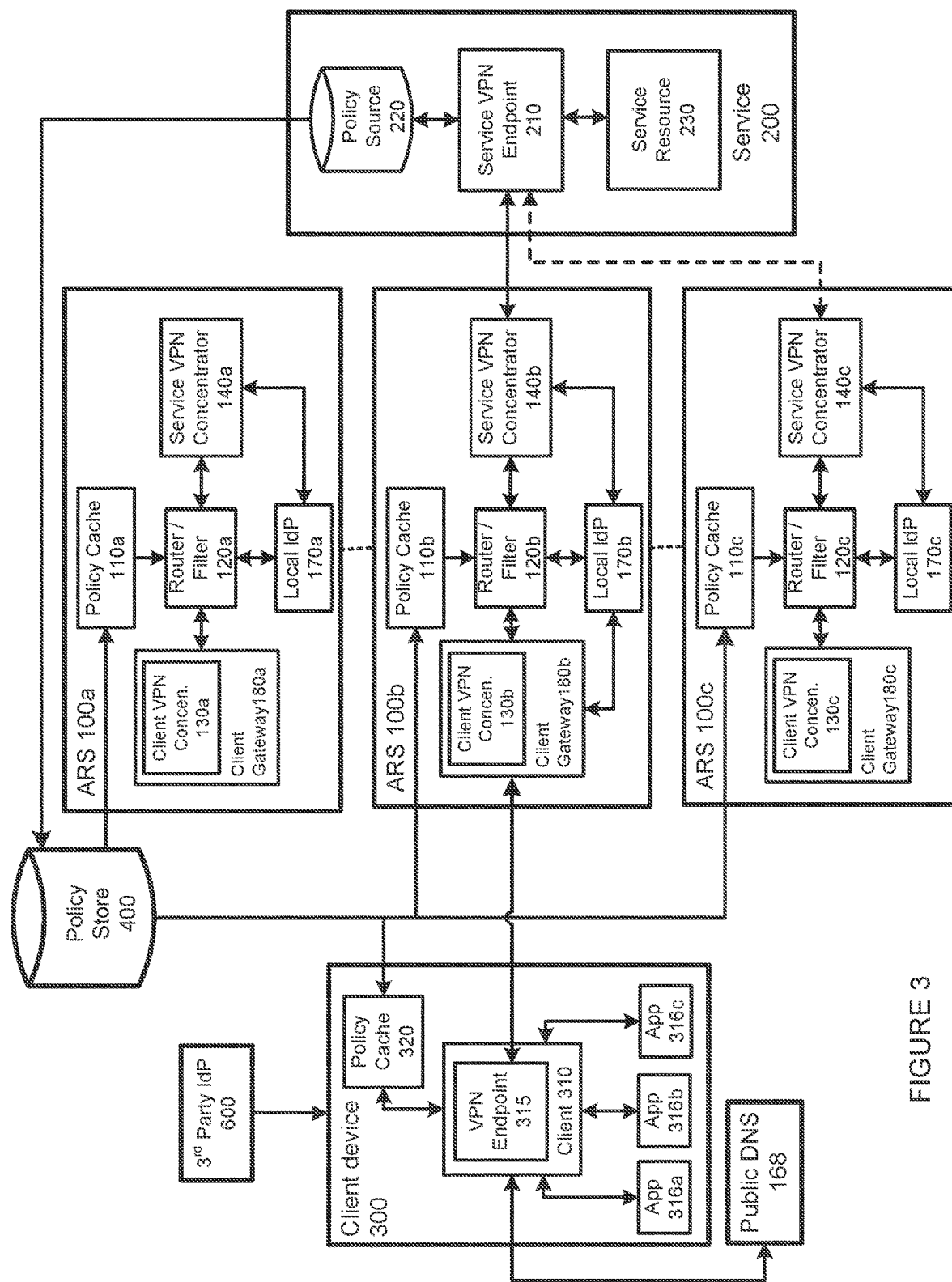
FIG. 3 illustrates a first example system architecture including a three instances of an ARS.

FIG. 3 illustrates a first example system architecture including three instances of ARSs (100a, 100b, and 100c) communicating with a client device and an enterprise resource service, one exemplary client device (300), and one exemplary enterprise resource service (200), along with an external policy store (400), and an IdP server (600). Additional client devices, ARS deployment options, local and public directory services, and enterprise resource services are not shown for clarity.

Each ARS (e.g. server 100a) further comprises one or more client VPN concentrator components (130a), one or more client gateway components (180a), a policy cache component (110a), one or more service VPN concentrator components (140a), a local IdP (170a), and a router/filter component (120a). These components are interconnected using standard networking components.

Each ARS is configured to allow an endpoint to connect to it using a single endpoint-originated (e.g. outbound) secure connection For example, each of the source and destination endpoints connect to an ARS using an outbound VPN tunnel(s), where the ARS validates one or more aspects of each originating endpoint (and originating endpoint user and/or application, as required by policy), de-multiplexes the sessions over the VPN connections, masks sensitive connection information, mediates, inspects, and routes traffic to/from that endpoint securely. This approach limits information leakage about the endpoints. Each of the source and destination endpoints originate their connections to the ARS, thereby improving the security of each endpoint by not requiring the endpoint to accept unauthenticated inbound connection traffic.

An ARS mediates transfer of session network packets between endpoints by receiving encrypted packets from each authenticated endpoint, applying policy-based header and content inspection, and routing to the session packet flow between the endpoints, and delivering the packets to the destination endpoint(s). The ARS thus enforces limitations on the content that can be transmitted, the routing between endpoints, the ARS to which each endpoint is connected, the type(s) of network packet traffic (packet flows, protocols used, and content flows) that are permitted between designated endpoints, along with any necessary content protections such as encryption. If specified by policy, the packets are inspected within the ARS for content, and the content of specific packets changed or blocked to reduce information leakage or to filter non-policy conformant network packet traffic. In this manner, endpoints engage in the policy-mediated exchanges of network packet traffic without having extensive infrastructure deployed at each endpoint.

System components and functions are described in detail below in relation to a specific implementation of a single ARS server (100b). The system supports a plurality of ARSs operating cooperatively in a clustered arrangement in order to improve resilience to denial of service attacks and single-point component failures. As shown in FIG. 3, each of the illustrated ARSs (100a, 100b, and 100c) include substantially similar components and functions such that description in reference to the described ARS (100b) is also applicable to ARSs (100a and 100c).

The differences between the operation of a single ARS and a cluster of ARSs is that the session packets are routed between the ARSs over a network (either internet or protected private network) in accordance with policy and endpoints may connect to any authorized ARS and their traffic will be routed to any other authorized endpoint. The attributes of the routed packets (e.g. protections) are determined by one or more policy elements, and the packet processing components (e.g filtering, inspection, mediation) through which packets are routed may reside on any ARS the packets are routed through. Thus, when an example is given using a single ARS, the example applies equally to a multiple ARS cluster. When clustered, the system comprises multiple ARSs (e.g. 100*a*, 100*b*, 100*c*) that are communicatively coupled to each other over protected data circuits, forming an interconnected cluster of ARSs.

In some implementations, an ARS may be configured as either a client or service-facing stand-alone server called the ARS gateway (FIG. 4, 102) and ARS stitcher (FIG. 4, 104) respectively. The ARS gateway and ARS stitchers are partial implementations of an ARS providing only client device-facing or enterprise service-facing services. A client device (and enterprise service) establishes a connection with one or more ARS gateway and ARS stitcher in the same way these components establish connections with an ARS. The router/filter component, in some implementations, is provided by a stand-alone server called an Orchestration server (106, also shown in FIG. 4).

Referring once again to FIG. 3, an application (e.g. 316*a*) on client device (300), which is communicatively coupled to a first ARS (100*b*), requests a session to a service (200) that is accessible through a second ARS (100*c*), as indicated by the dashed lines. The first ARS determines whether access to the first ARS (100*b*) should be granted to the application on the basis of one or more policy elements.

The client gateway (180*b*) of the first ARS makes access control decisions based upon the connection information (e.g. user, device, application, session endpoints). It uses information retrieved one or more policy stores and from local IdP (170*b*) and, in some configurations, information retrieved from local IdP (170*c*) of the second ARS to make the access decision. In some implementations, the ARS uses a local identity provider (170, e.g. 170*a*/170*b*/170*c*) in order to validate a user and/or endpoint device. In a configuration, local IdP servers also share and exchange information with other IdP servers, such as IdP 600.

The router/filter component (120*b*) of the first ARS retrieves, from a policy cache (110*b*), policy source, or local directory, one or more policy elements that are applicable for the requested session and determines, based on these policy elements, the session packet routing and en-route processing required for the session.

The ARS (100*b*) is in direct or indirect communication with at least one external policy store (400), at least one client device (300), and at least one enterprise service (200). When in direct communication, there is a VPN tunnel between the ARS and the corresponding component (e.g. client device or enterprise service).

The service VPN concentrator and client VPN concentrator connections are generally symmetric their structure and processing They serve as VPN termination points for inbound VPN connection requests (from endpoints, e.g. service and client devices respectively), provide authentication and authorization checking, manage connection-based encryption/decryption, and provide remapping (where required) of an endpoint's potentially private information.

4.3.1.1 ARS Policy Cache/Store/Elements

Each ARS is operably connected over a network to, and receives policy elements from, a policy store (400). Additional complexity is reduced by the system in that it aggregates and enforces policies from differing sources in a uniform manner. Consider a first enterprise service that requires a first access policy, and a second enterprise service that requires a second access policy, where the two policies are disjoint and possibly contradictory. The system aggregates and homogenizes these policies from each of the enterprise services, and consolidates the enforcement of an aggregate policy on client devices (and enterprise services) as they connect to the system. The policy enforcement provided by the system differs depending upon which endpoints are being connected.

Policy store (400) provides storage and aggregation of policy elements from a number of sources. First, the policy store is in communication with policy source (220) of one or more enterprise services (200). The policy store receives policy element(s) from the policy sources (220) and optionally from policy stores of one or more additional services (not shown). Second, the policy store is in communication with a policy configuration component (not shown), which permits authorized users to enter policy elements and manage the storage and aggregation of policy, including the resolution of any policy conflicts that may occur. Third, the policy store is in communication with, and receives policy elements from, other third party policy sources (not shown) such as externally defined policies for managing client devices, identity, or other aspects of the system. The policy elements received from these policy sources are stored in the policy store, associated with one or more client devices, connection types, and enterprise service components. In one configuration, the policy store processes received policy from various sources to combine policy elements; translates the policy elements into forms usable by client devices and/or enterprise services; generates, based on policy, policy elements usable by client devices and/or ARSs; and/or performs other policy maintenance and processing functions.

The policy store stores and maintains updated versions of each of the policy elements provided by an enterprise service endpoint, as well as other policy elements received from other sources. In an exemplary implementation, the policy store actively requests (polls) for policy element updates from each of the configured policy sources. In other exemplary implementations, the policy store receives periodic push notifications from one or more policy sources which provide policy elements as they are updated.

The policy store is in communication with the policy cache (320) of each client device (300) and with policy caches (110*a*, 110*b*, 110*c*) of ARSs in order to distribute or otherwise make available the applicable policy elements. The policy store makes the policy elements available, either by publishing to a common policy store that the policy caches obtain their policy elements from, publishing the policy elements to an ARS (which the policy caches obtain the policy elements from), and/or publishing the policy directly to the policy caches of the client devices and ARSs. The ARSes and client device(s) maintain updated versions of policy elements, for example by periodically polling the policy store for updates or by receiving push notifications from the policy store when policy element(s) are updated.

The ARS policy cache (110*b*) receives policy elements from one or more policy store(s) (400) and/or other policy sources (not shown), aggregates and homogenizes the policy elements, and makes the policy elements available to the system. For example, the policy cache may periodically poll the policy store for policy and/or receive push notifications of updated policy from the policy store; for example, when policy elements corresponding to a service endpoint change or when a new service endpoint connects to an ARS. The received policy element(s) are optionally stored (cached) locally to the ARS in a policy cache (110*a*).

4.3.1.2 Client VPN Concentrator

The client VPN concentrator component (130*a*) has four functions. First, it terminates the VPN connection from the client device's VPN endpoint, and manages the connection level encryption. Second, it validates the client device, user, and application in accordance with policy (using external services such as an IdP), enforces conditions specified in the policy elements to determine whether a specific session should be established, and it provides connection and device attribute masking that provides anonymity to the client device's configuration. For example, the client VPN concentrator component refuses to allow a communication session upon determining that, according to the policy element(s), a particular user/device is not allowed to access a particular requested service resource.

Successful authentication requires that the requesting user, device, and application are known to the local IdP and are allowed, by policy, to access the ARS. For example, a user identity corresponding to the requesting user must match a user identity known by the local IdP. Similarly, a device identifier, e.g. device UUID, must match a known device identity. An application must also be known to the local IdP. For example, a certificate associated with the requesting application must match a copy of a certificate stored by the IdP and known by the IdP to have previously been associated with the application. The local IdP also checks user, device, and/or application access rights to ARS (100*b*). In some configurations, the client gateway (180*b*) also relies on one or more policy elements to determine whether user, device, and application are allowed to access a requested service. In additional or further configurations, the client gateway (180*b*) relies on additional information (e.g. DNS check, device location check, device health check, etc.) provided by one or more additional service resources (not shown) to determine whether or not to open a VPN tunnel. The client VPN concentrator assigns a unique IP address to each VPN tunnel or stream through the client VPN concentrator.

4.3.1.3 Client Gateway

The Client gateway component (180) determines a local client IP address associated with an application participating in the session and a local service IP address associated with the service or service resource endpoints of the communication session. The client gateway component publishes the local service IP addresses to a local directory service, with components on the current and clustered ARSs. For example, the client gateway component shares a local IP address associated with client device (300) applications (e.g. 316*a*) and local service IP address associated with enterprise service (200) with the one or more router/filter components (120*a* and 120*c*).

The client gateway (180), in addition to populating a directory service like a local DNS (160), determines whether a requested session between a particular app and a particular endpoint is allowed to be initiated. In one configuration, the client gateway component receives policy elements from a policy source, policy cache, or orchestration API (FIG. 5, 185) and uses the policy elements to determine whether or not to allow a session. In a configuration, the client gateway component retrieves the policy elements and retrieves device, user, and application-related information from a local directory or local IdP (170) and makes a session allowance decision.

Figure 5:
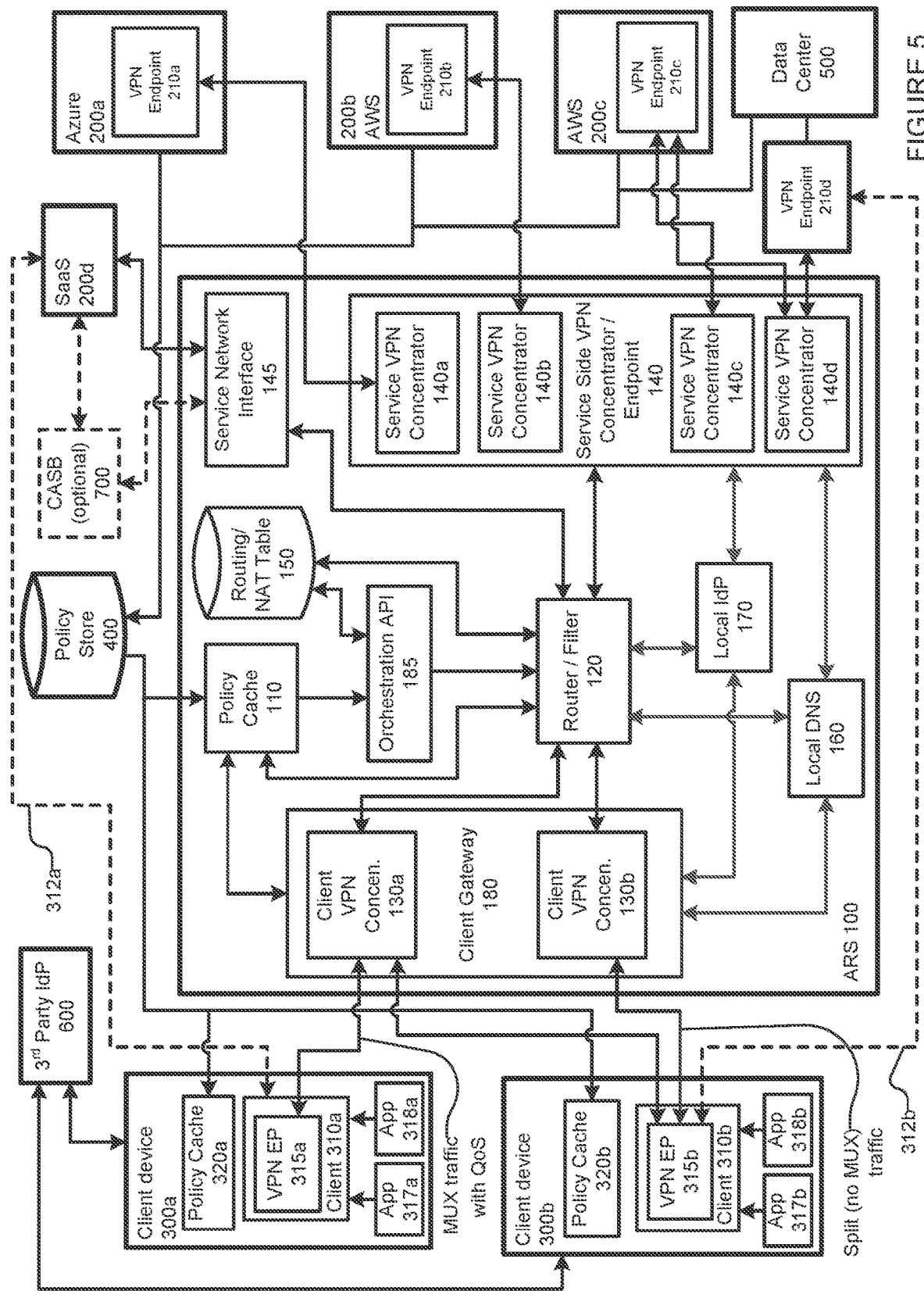
FIG. 5 illustrates a third example configuration of a Universal Access System.

In an exemplary implementation, as shown in FIG. 5, the client gateway component (180) interacts with one or more client VPN concentrators (130*a*, 130*b*) to populate the routing/NAT table (another local directory) with information extracted from wrappers of one on more packets received from client devices (300*a*, 300*b*) and service VPN endpoints (e.g. 140, 140*a*) populates the routing/NAT table with information extracted from wrappers of one or more packets received from services (200*a*, 200*b*, 200*c*) and data center (500).

The client gateway component includes an address translation component (e.g. a NAT service/NAT table, collectively NAT component, or other implementation of a directory service) and an authentication/authorization component. The NAT service is used to translate addresses of VPN tunnel traffic between tunnel side address and ARS side addresses. The authentication/authorization service makes policy-based decisions on whether a VPN connection and/or session request should be honored. The NAT component retrieves information from routing/NAT table (150), determines the local IP addresses that comprise the local client and local service IP addresses, and uses the information retrieved from routing/NAT table to assign local IP addresses as local client and service IP addresses. The system maps each local IP address to an application or service, and associates the local IP addresses with corresponding service VPN concentrators, client VPN concentrators, and multiplexed tunnels.

The NAT component maps each local service IP address to an enterprise service (200*a*, 200*b*, 200*c*, 200*d*, or 500) and associates each local service IP address with a corresponding service VPN concentrator (140*a*, 140*b*, 140*c*, or 140*d*), or to service network interface (145). The NAT component maps each local client IP address to an application (317*a*, 317*b*, 318*a*, or 318*b*) and associates each local client IP address with a corresponding client VPN concentrator (130*a* or 130*b*). If a VPN tunnel from a client device VPN endpoint (e.g. 315*b*) to a client VPN concentrator is a multiplexed tunnel comprising multiple streams, the router/filter component associates a local client IP address to a client VPN concentrator and to a stream for each application that is using the multiplexed tunnel.

Using NAT, the system rewrites endpoint addresses to ARS local addresses in order to hide the endpoint architecture details.

4.3.1.4 ARS Router/Filter

Returning to FIG. 3, each router/filter component (e.g. 120*a*, 120*b*, 120*c*) provides routing, filtering, firewall, and packet/content inspection services to connections on a policy-determined basis.

The router/filter component (120*b*) determines, based on the selected policy elements, whether or not a communication session between a particular application (e.g. 316*a*) and enterprise service (200) should be established. The router/filter component determines whether one or more policy element(s) are applicable to a requested communications session (e.g. policy applicable to user, device, and/or application and requested service). The router/filter component receives policy elements corresponding to service (200) from the policy cache (110*b*).

A router/filter component (120*b*) determines routing for packets within the ARS (100*b*), between two or more ARSs (100*a*, 100*b*, 100*c*), and between additional ARS services (e.g. filtering, inspection, and additional clustered ARS) that the packets must be routed through as they move between endpoints.

If the session is allowed, the router/filter component (120b) of the first ARS communicates a local client IP address associated with application (316a) to the router/filter component (120c) of the second ARS. The router/filter component (120c) of the second ARS communicates a local service IP address associated with the requested resource to router filter (120b) of the first ARS. The router/filter component of the first ARS configures client gateway (180b) of the first ARS with the local service IP address on the second ARS. Router/filter component (120c) of the second ARS configures service VPN concentrator (140c) of the second ARS with the local client IP address on the first ARS. The router/filter component (120b) and the router/filter component (120c) make entries in routing tables of the first ARS (100b) and the second ARS (120c), respectively, that are used to route all packets between the client gateway (180b) and service VPN concentrator (140c)/endpoint ID. The client gateway (180b) of the first ARS receives encrypted packets addressed to the requested service connected to the second ARS and routes the encrypted packets to the requested service by changing the destination address of the packets to the local service address (i.e. to a local IP address associated with service VPN concentrator (140c) of the second ARS). ARS 100b routes the packets to ARS (100c), where they are received by service VPN concentrator (140c) of the second ARS. The service VPN concentrator changes the destination address of the packets to the IP address of the requested service and delivers them to the requested service. Packets from the requested service on the second ARS are routed in a similar manner to application (316a) on the first ARS.

In an exemplary implementation, a packet received by the ARS from a client device is encapsulated in a wrapper that includes a particular destination endpoint ID. The router/filter component interrogates a directory service in order to determine a local IP address associated with a particular endpoint ID. The router/filter component then readdresses the packet with the local IP address of the specified endpoint ID and then routes the readdressed packet to the local IP address.

Other aspects of the router/filter component are the provisioning of packet inspection and blocking services. These types of services are normally associated with a firewall component (not shown). The firewall component is configured with connection-based policy from the policy cache, and connection packets are routed to the firewall component by the router/filter component. Packets that pass the firewall component's packet inspection and blocking component are routed onward, either to additional components or to a service VPN concentrator, a client VPN concentrator, an ARS gateway server, or an ARS stitcher server.

In other implementations, the router/filter component comprises optional detailed packet inspection logic such as data loss prevention (DLP) components, which inspect sets of packets for specific types of content. If required by policy, the router/filter component routes connection network packet traffic through a DLP component for inspection.

Other services may be added (illustrated in FIG. 5), including a routing/NAT table (150) which is a directory that stores routing and IP mapping information including: IP address:port corresponding to client devices (310a, 310b) and enterprise services; service connection IDs (i.e. identification of service VPN concentrator or service network interface to which each service is connected and optionally a publisher-specific encryption key or an indication of a location of a key associated with one or more services); application connection IDs (i.e. identification of client VPN concentrator to which each client device VPN endpoint (315a, 315b) is connected) and the identification of client VPN tunnel and individual stream (in the case of multiplexed tunnels of connections) over which data to and from each application is tunneled.

Additional services may include a local DNS (160), which is a directory that includes local client domain names and IP addresses and local service domain names and IP addresses and optionally, publisher-specific encryption keys or locations of keys associated with local service domain names. In one configuration, the local DNS delegates responsibility for assigning local domain names and for mapping local domain names to local service and client IP addresses to a router/filter component (120). In this configuration, the router/filter component (120) determines local IP addresses and populates Local DNS (160) with local client IP addresses and local service IP addresses.

4.3.1.4.1 Packet Routing

The client VPN concentrator (130b) receives, from client (310), encrypted outer tunnel packets from one or more applications (e.g. 316a). The outer tunnel packets each include a source IP address that corresponds to client device (300) and a destination IP address that is a virtual IP address that corresponds to ARS (100b). The client VPN concentrator uses a VPN connection encryption key to decrypt the packets, effectively removing outer tunnel VPN encapsulation to expose inner tunnel packets. Each inner tunnel packet is optionally encrypted with session-specific encryption and encapsulated with an unencrypted wrapper that includes an endpoint ID corresponding to a particular service (e.g., 200). The client gateway (180) looks up a local service IP address corresponding to the endpoint ID of the service and changes the destination IP address of each inner tunnel packet, without decrypting it, to the local service IP address to which the packet was addressed by the client (310); i.e., the client gateway changes the destination address to a local IP address associated with the service VPN concentrator that is connected to service (200). The client gateway passes the packet to a router/filter component (120) which determines, based on policy, whether the packet should be routed to a destination and, if so, passes the packet to the service VPN concentrator represented by the packet's destination local IP address (i.e. to service VPN concentrator (140b)). The service VPN concentrator (140b) receives encrypted inner tunnel packets addressed to its local service IP address. The service VPN concentrator changes the destination IP address of each inner tunnel packet, without decrypting it, to an IP address associated with service (200), applies outer tunnel encapsulation to the inner tunnel packet by encrypting it using a VPN connection encryption key, and sends the packet to the VPN endpoint of service (200).

Service VPN concentrator (140b) receives outer tunnel packets, encapsulated with VPN encryption, from Service (200). The Service VPN concentrator removes the VPN encapsulation to expose inner tunnel encrypted packets, each encapsulated in a wrapper that includes an application ID associated with a particular application. The Service VPN concentrator looks up a local client IP address corresponding to the application ID and changes the destination IP address of each inner tunnel packet, without decrypting it, to the local client IP address (i.e. to a local IP address corresponding to the client VPN concentrator and, optionally, a particular multiplexed stream corresponding to the particular application). The client VPN concentrator receives the encrypted inner tunnel packets and changes the destination IP address of each packet, without decrypting it, to an IP address associated with a corresponding particular application (e.g. 316*a*). The client VPN concentrator (130*b*) applies outer tunnel encapsulation to each packet by encrypting it using a VPN connection encryption key and sends the packet to VPN endpoint (315).

In some exemplary implementations, when a gateway component of the ARS first receives a packet destined for a particular endpoint ID, the gateway looks up the endpoint ID in a local destination database that includes sessions indexed by session ID and/or endpoint ID. The lookup returns the local service IP address assigned to the VPN concentrator associated with the endpoint ID, and the packet is routed to that address in accordance with policy. If the endpoint ID is not found in the local destination database, the gateway unwraps the packet and routes it via the internet.

4.3.1.4.2 Network Connections

The ARS uses a directory service to resolve service IDs, names, and to support routing of packets between endpoints; for example translating the destination address of a packet received from a client device to a local client IP address corresponding to a client-side VPN concentrator to which the client device has a VPN tunnel open. The ARS applies its combined policy and determines the routing of the packet from an input VPN concentrator to an endpoint-side VPN concentrator to which the destination service endpoint is connected. In a first exemplary implementation, a single ARS includes both the client-side VPN concentrator and the endpoint-side VPN concentrator. In a second exemplary implementation, a first ARS includes the client-side VPN concentrator and a second ARS includes the endpoint-side VPN concentrator. As part of the routing, an ARS that includes a client-side VPN concentrator translates the destination service name to a destination address that is a local service IP address of the service-side VPN concentrator that has a VPN tunnel open to the destination service endpoint. Finally, the ARS that includes the service-side VPN concentrator translates the destination address of the packet to the IP address of the destination service endpoint and delivers the packet to the VPN tunnel. These layers of IP address translation prevent attackers from discovering the actual IP addresses of the endpoints.

Low level network connections between the client device(s), ARS(s), and enterprise resource services are made using standard networking, for example, TCP/IP based networking such as commonly found on the Internet. TCP/IP v4 and TCP/IP v6 may be used as desired. Other protocols may be used without deviating from the intent of the invention.

Connection packet traffic is protected for privacy and integrity using standard IPSec techniques and/or by standard VPN tunneling techniques as known to those skilled in the art. Session packet traffic may be optionally encrypted end-to-end using a session-specific encryption. In some exemplary implementations, an endpoint encrypts the network packet traffic being sent an ARS using a first encryption layer based on a secure VPN connection (an "outer tunnel") negotiated between the endpoint and an ARS it is connected to. In some configurations, a second encryption layer (an "inner tunnel", or session encryption) based upon the destination endpoint is also used. The second encryption may be performed using a publisher-specific key negotiated between the service endpoint and the client device, or a key provided in a directory or policy.

The system supports multiple levels of data protection in order to protect the packet traffic. First, a policy element controlling the operation of the ARS requires that communications between at least one of the endpoints and the ARS be tunneled through encrypted VPN connections. The ARS supports end-to-end data encryption including the provisioning of client devices to apply a second level of encryption to the packets that are tunneled through the encrypted VPN connections. In an exemplary implementation, the ARS facilities a dynamic negotiation of a session encryption key between a client device endpoint and an enterprise service. The client device uses the negotiated encryption key to apply the second level of encryption to the communications. Alternatively, the system may use a fixed (static) key associated with a session or endpoint.

In an exemplary outer-inner tunnel implementation, the endpoint receives an encryption key from an ARS. The publisher component (not shown) creates and maintains a record of the local IP address associated with the endpoint-linked with a publisher-specific encryption key negotiated with the endpoint. In an alternative implementation, the endpoint retrieves the publisher-specific encryption key from a policy cache (320 or 110*b*) or from an ARS data store (not shown).

For example, an endpoint uses the publisher-specific encryption key to encrypt all session traffic to/from the endpoint. The client encapsulates (wraps) the inner tunnel encrypted data packets for transmission to an ARS with a wrapper that includes data elements representing one or more of: source IP:port, application ID, connection ID, session ID, and endpoint ID. The client does not encrypt the wrapper with the publisher-specific encryption key. The client defines a unique connection ID for each connection (VPN tunnel or stream) between the client and the ARS. In some exemplary implementations, local policy defines one or more additional data elements that the client includes in the wrapper. Typically, the wrapper protects a packet for privacy or integrity.

The network connections between the client device(s), enterprise service(s), and ARSs optionally (under policy control) multiplex the network packet traffic between an endpoint to an ARS within a single VPN tunnel. When the network packet traffic is multiplexed, a single VPN tunnel is created between the endpoint and the ARS, and network packet traffic for multiple sessions are transmitted in an interleaved manner via the VPN tunnel.

4.3.1.5 Third Party Identity Provider (IdP) (600)

In an exemplary implementation, the system relies upon a third party IdP (600) to authenticate users for access to the client device and to authenticate access of users and/or clients to device applications. A third party IdP (600) includes, for example, an OAuth, OpenID, or SAML identity provider. In an alternative exemplary implementation, the client device relies upon one or more device-provisioned digital certificates in order to authenticate the user and device. A user and/or device obtains the necessary certificates during an enrollment process.

4.3.1.6 Enterprise Service

One type of endpoint is an enterprise service (200) is in communication with an ARS (100*b*) via an outbound VPN tunnel from the service VPN endpoint (210) to a service VPN concentrator (140*b*) of ARS (100*b*), thus connecting an enterprise service to the ARS. The VPN endpoint further comprises functionality that causes service availability and the related policies to be published. This functionality is sometimes implemented as a separate component (not shown separately from the service VPN endpoint) called a publisher. Exemplary enterprise services include Infrastructure as a Service systems (IaaS) such as Amazon AWS and Microsoft Azure; Software as a Service systems (SaaS), for example Microsoft Office365; and enterprise data centers. The enterprise service includes one or more enterprise services (230), which are particular service endpoints to which client devices are granted policy-based access. For example, an AWS service includes one or more Virtual Private Cloud (VPC) service resources, each of which are subject to the same or different sets of policy-based access policy elements. The enterprise service includes policy source (220) which stores policies that govern access to the service resources. The policy source is in communication with policy store (400) as described above.

Service VPN endpoint (210) of each enterprise service (200) receives the applicable policy from policy source (220) and establishes one or more outbound VPN tunnels, each configured according to an aspect of the policy, to one or more service VPN concentrators (140*a*, 140*b*, 140*c*) of ARSs (100*a*, 100*b*, 100*c*). In a first example usage, a single VPN tunnel is created from a service VPN endpoint to a service VPN concentrator and all network packet traffic targeted to a specific ARS is routed through that single VPN tunnel. In an alternative example usage, a plurality of VPN tunnels are created from a service VPN endpoint to a plurality of service VPN concentrators, and the network packet traffic is routed in accordance with one or more policies as shown in FIG. 5 (VPN endpoint 210*c* connecting to Service VPN concentrators 140*c* and 140*d*)

4.3.1.7 Client Device

A client device (300) includes client application ("client") (310) which includes or interacts with a VPN endpoint (315) on the device. A policy cache (320) of the client device receives the policy elements corresponding to service (200) from policy store (400). Applications (316*a*, 316*b*, and 316*c*) execute on the client device and interact with the executing client application ("client" 310), where the client application monitors the applications activity to detect and to intercept network requests for access to service resources.

An example application is a browser application including a web interface page for accessing an enterprise service. Exemplary client devices include desktop and portable computers, tablet computing devices, and smart phones.

When the user requests, via an application, access to a service or to a particular service resource, the application makes the network request to the OS network layer, where it is intercepted by the client application (310) (aka the interceptor). The client retrieves, from policy cache (320), one or more policy(ies) applicable to the request, i.e. policy corresponding to the service. The client identifies the policy specifying whether or not the user and/or application is allowed to access a requested service resource, and makes a determination on whether or not to proceed with the access request based on the policy. Client devices rely on external authentication and authorization services in to authorize users to access client devices and to authorize users or user/device pairs to access applications. For example, the client application relies on a client gateway (180*b*) and/or a local IdP (170*b*), e.g. a SAML IdP, to authenticate a user, device, and application prior to approving a connection request from the client device's VPN endpoint (315). In an exemplary implementation, this authorization is performed in real time. Alternatively, in other implementations, it is performed during an enrollment step with the authorization encoded in one or more device-based certificates or assertions provided by the IdP.

After an application requests access to an endpoint service (e.g. service (200)), the client device's VPN endpoint (315) determines if a VPN tunnel corresponding to the application is already in place with an ARS' client VPN concentrator (e.g., 130*b*). In some cases, a VPN tunnel may be present to a first ARS, but the routing specifies that a connection to a second ARS is more appropriate. If the desired VPN tunnel as not been previously established, the client VPN endpoint requests the IP address to send the connection request to, either from a public or private DNS (168) or other directory service and makes the VPN tunnel connection to that address. Accordingly, the client VPN endpoint opens one or more VPN tunnels between the client (310) and one or more client VPN concentrators (at the ARS) and routes encrypted packets to and from the client. It provides an ARS-only local client IP address for each VPN connection for the purposes of routing packets to/from the client device. The VPN tunnel(s) are configured in accordance with one or more policy elements.

For purposes of illustration, FIG. 3 shows a single VPN connection between the client device and an ARS. FIG. 5 illustrates a more complex example where the client device (FIG. 5, 315*b*) opens a plurality of VPN tunnels between the client device and disparate client VPN concentrators (FIG. 5, 130*a*, 130*b*).

In an exemplary implementation, a VPN tunnel between an endpoint (e.g. a client device or a service) and an ARS remains open as long as the certificate is valid. In an alternative exemplary implementation, the ARS requires a user of a client device to re-authenticate periodically, for example every hour, every 4 hours, every day, or every week. The ARS leaves a VPN tunnel in place unless a re-authentication attempt fails rather than tearing down the VPN tunnel prior to re-authentication and establishing a new VPN tunnel. Re-authentication parameters are configured based on a connection and session policies that incorporate source and destination endpoints of a client application's network packet traffic. For example, a session to a financial endpoint is configured to require frequent re-authentication while a session to an email endpoint is configured for a single initial authentication. A user and device are authenticated or re-authenticated before the user is allowed to access client device applications. In an exemplary configuration, users are only allowed to access authorized applications and are not granted network access.

The client device need only know the connection address of a connection point into the system (the client VPN concentrator), a name of an endpoint to which the client device wishes to connect, and the client's credentials. The system handles the name mapping between private names and endpoint IDs and a session endpoint, provides redundant routing and connection services, and provides policy-based controls that inspect and mediate when, where, and how a session between a client device and enterprise service are to be connected. The system masks the non-essential client device details (such as IP address, location, and precise client configuration) from the counterparty endpoint, and similarly masks the counterparty endpoint details from the client device. The client device makes an endpoint-specific connection to an ARS and provides the unrouteable name or virtual IP address of the desired destination endpoint. Destination endpoint virtual IP addresses are published to an ARS-specific directory service such as an ARS-internal (e.g. private) DNS, a name service such as an X.400 directory, an internal lookup table, or a public DNS. Preferably, the virtual IP address is in a non-routable IP address space. In this manner, the actual IP addresses of the destination endpoint are hidden by the ARS and are not exposed to either the user or the network computing environment. Session packet traffic is routed within the ARS routing domain on the basis of the selected virtual IP addresses. The system makes the interconnection to the desired destination endpoint on the client device's behalf after verifying the client device, user, and application making the request are operating in accordance with applicable policy, and inspects and mediates network traffic that flows as part of the session.

4.3.1.8 Policy

Each policy comprises one or more policy elements that include one or more specifications defining the governance over aspects of the access and connection of client device applications (e.g. 316a) (source endpoint(s)) to one or more service resources (230) of an enterprise service (destination endpoint(s)). There can be a plurality of policies (and policy elements) applied at each aspect of the session between the endpoints. An example policy identifies particular users, client devices (e.g. user/device pairs) and/or user roles that are allowed to access a particular service resource, as well as authentication, connection, encryption, data filtering, and routing requirements.

Policy elements may be specified in any form usable by the system, and are translated by the policy store into a form required by the system element that uses them prior to distribution. This allows the policies to be encoded in a standard format for the policy server, and to be used in a "native" format of the specific component that uses them. In this way, the system may be made to work with a variety of providers of VPN, router, content inspection, identity provider, and similar services.

Example policy and policy elements described herein are presented in table form without regard to the encoding used within the system. Any suitable encoding may be used.

4.3.1.8.1 Policy Lookup

Policy elements are stored in one or more directories, indexed by one or more of the following elements.
User
Client device ID
Application (ID)
Endpoint ID
Connection ID
Session ID Applicable policies are matched by searching for the appropriate combination of these index attributes. For example, to get all policies associated with a particular session, select policy elements that match on the Session ID.

4.3.1.8.2 Authentication Policy Elements

Policy-based policy elements requiring specific types of authentication for users, applications, and devices are part of the policies defined for the system. User authentication policy elements may specify the service (e.g. IdP) to use for validating user credentials, types of acceptable validation, and the amount of time a validation may be relied upon before it must be repeated. Application authentication policy elements include information about the applications on a device, including their application signatures, their permitted configuration(s), and the types of connections that they may make. Device authentication policy elements include information that permits the device to be verified, including device ID, certificate IDs, requirements for compliance checking, etc.

| Policy element name | Element type | Comments |
| --- | --- | --- |
| Endpoint validation method | Certificate, user name/credential, device fingerprint, device ID (e.g. GUID/UUID, MEID, MAC, CPU ID), compliance check | One or more specified techniques to use to validate an endpoint |
| IdP policies | IdP IDs | IdP to use, or list of IdP to use. |
| Certificate validation authority name/ID | Name of authority that can validate a certificate | DNS or other authority identification. |
| Device certificate | Required device certificate attributes | Required device certificate(s) for validation. Could specify certificate required or certificate attributes required. |
| Device fingerprint specification | Specification of permitted device fingerprints | Specifies method/process of calculating fingerprint |
| Permitted/denied device fingerprint elements | Specification of permitted or denied device fingerprint elements. | Specified permitted or denied fingerprint elements, such as device OS level, compliance check types/parameters, age of most recent compliance check. |
| Application validation method (per enumerated application) | Certificate, application signature, application behavior | One or more specified techniques to use to validate an application |
| Application configuration validation (per enumerated application) | Approved configuration for a specific application | Specific configuration or reference to a policy element that specifies that configuration |
| Application connection (endpoint) validation | Approved endpoints for the application to connect to | ID of specific endpoints the application is authorized to connect to (e.g. a DNS name, endpoint ID) |
| Validation persistence time | Amount of time a previous validation remains good | After this amount of elapsed time, the validation must be re-performed. |

4.3.1.8.3 Session-Based Policy Elements

Policies may be associated with particular sessions or groups of sessions based upon information and attributes of the session endpoints.

| Policy element name | Element type | Comments |
| --- | --- | --- |
| Session encryption | | Specifies where session encryption is required, and if so, how session keys are handled (static-shared, negotiated, etc.) |
| Endpoint validation method | Certificate, user name/credential, device fingerprint, device ID (e.g. GUID/UUID, MEID, MAC, CPU ID), compliance check | One or more specified techniques to use to validate an endpoint |
| Device certificate | Required device certificate attributes | Required device certificate(s) for validation. Could specify certificate required or certificate attributes required. |
| Device fingerprint specification | Specification of permitted device fingerprints | Specifies method/process of calculating fingerprint |
| Permitted/denied device fingerprint elements | Specification of permitted or denied device fingerprint elements. | Specified permitted or denied fingerprint elements, such as device OS level, compliance check types/parameters, age of most recent compliance check. |
| Application validation method (per enumerated application) | Certificate, application signature, application behavior | One or more specified techniques to use to validate an application |
| Application configuration validation (per enumerated application) | Approved configuration for a specific application | Specific configuration or reference to a policy element that specifies that configuration |
| Application connection (endpoint) validation | Approved endpoints for the application to connect to | ID of specific endpoints the application is authorized to connect to (e.g. a DNS name, endpoint ID) |
| Validation persistence time | Amount of time a previous validation remains good | After this amount of elapsed time, the validation must be re-performed. |
| Enforce endpoint anonymity | T/F | Enforces endpoint attribute masking |

In various implementations, the policy-based data encryption policy elements differ for each endpoint, are common between one or more endpoints, or alternatively are more finely determined, such as, for example, based upon user and group, device type, device location, time of access, the application requesting access, or service parameters used.

A first form of a policy-based data encryption policy element includes a requirement that a client device dynamically negotiates an encryption key with an enterprise service endpoint, e.g., with a publisher component of an endpoint, when first establishing, via an ARS, a session to the endpoint and use the negotiated key to encrypt all network packet traffic sent as part of that session.

A second form of a policy-based data encryption policy element includes a requirement that a client device retrieves a pre-defined encryption key from a storage location of the ARS, for example from a stored policy or from a database connected to the ARS, and use the retrieved encryption key to encrypt all network packets send as part of a session. The predefined key may be a-priori predefined or may be written to the policy store by an ARS as sessions are established.

4.3.1.8.4 Connection Policy Elements

Connection policy elements describe aspects of policy that control the VPN connection between a client device and an ARS and/or service and an ARS.

| Policy element name | Element type | Comments |
| --- | --- | --- |
| Session encryption | | Specifies where session encryption is required, and if so, how session keys are handled (static-shared, negotiated, etc.) |
| Enforce endpoint anonymity | T/F | Enforces endpoint attribute masking |

| Policy element name | Element type | Comments |
| --- | --- | --- |
| Endpoint validation method | Certificate, user name/credential, device fingerprint, device ID (e.g. GUID/UUID, MEID, MAC, CPU ID), compliance check | One or more specified techniques to use to validate an endpoint |
| Device certificate | Required device certificate attributes | Required device certificate(s) for validation. Could specify certificate required or certificate attributes required. |
| Device fingerprint specification | Specification of permitted device fingerprints | Specifies method/process of calculating fingerprint |
| Permitted/denied device fingerprint elements | Specification of permitted or denied device fingerprint elements. | Specified permitted or denied fingerprint elements, such as device OS level, compliance check types/parameters, age of most recent compliance check. |
| Application validation method (per enumerated application) | Certificate, application signature, application behavior | One or more specified techniques to use to validate an application |
| Application configuration validation (per enumerated application) | Approved configuration for a specific application | Specific configuration or reference to a policy element that specifies that configuration |
| Application connection (endpoint) validation | Approved endpoints for the application to connect to | ID of specific endpoints the application is authorized to connect to (e.g. a DNS name, endpoint ID) |
| Validation persistence time | Amount of time a previous validation remains good | After this amount of elapsed time, the validation must be re-performed. |

4.3.1.8.5 Inspection and Mediation Policy Elements

Policy-based network packet inspection and mediation policy elements are selected dynamically on the basis of one or more of user, application, endpoint, and session. The policy-based network packet inspection and mediation policy elements may differ for each endpoint and each network packet traffic direction, based upon factors and considerations including user and group, device type, device location, time of access, the application requesting access, or service parameters used.

Inspection and mediation policy elements define how communications packets and communication streams are to be inspected, and the policy elements that configure those inspections. Inspection policy elements may identify the inspection components to use to inspect packets, the type of inspections to be performed (e.g. packet filtering, threat detection (virus scanning, executable program checking), deep packet inspection, Data Loss Prevention), and configuration parameters for the inspection components.

| Policy element name | Element type | Comments |
| --- | --- | --- |
| Data filtering | Data filtering service definition (e.g. Service ID) Data filtering service specifications | Policy element(s) that specify the passing, blocking or modification of network packet traffic based upon inspection of that packet traffic, where the policy element is matched based upon data or metadata in the packets that matching known and disapproved content and/or packet patterns. |
| Packet filtering | Packet filtering service definition (e.g. service ID) Packet filtering service specifications | Policy elements that specify passing, blocking or modification of network packet traffic based upon the packet type (e.g. ICMP, IP), protocol type, service the packet is targeted to (e.g. block all HTTP packets), ISO protocol layer (e.g. block all level 7 packet traffic), or specific packet contents (e.g. TCP/IP SYN packets). |
| Content filtering | Content filtering service definition (e.g. service ID) Content filtering service specification | Policy elements that specify requirements for content filtering processing, and further specify allowed and/or prohibited packet contents. |
| Threat detection filtering | Threat detection service definition (e.g. service ID) Threat detection service definition | Policy elements that specify requirements for threat detection processing, and further specify the threats to monitor for (including optional threat signatures) |

4.3.1.8.6 Routing Policy Elements

Routing policy elements define how communication packets are routed within the system. Optional and mandatory routing paths may be defined, as may routing to/from specific components (such as inspection and/or firewall components).

| Policy element name | Element type | Comments |
| --- | --- | --- |
| Enumerated route | | Enumerated route for packets |

4.3.1.9 Service VPN Concentrator

The ARS uses service VPN concentrator (140b) to set up a VPN tunnel from VPN endpoint (210) and routes encrypted packets to and from service (200). In exemplary implementations, the VPN concentrator sets up two or more VPN tunnels from the service to the ARS for redundancy or for connection throughput purposes. The VPN concentrator or a stitcher component of the ARS, assigns a unique local service IP address to each connection through the VPN concentrator.

The VPN endpoint (210) encrypts outgoing inner tunnel packets destined for the ARS with a publisher-specific encryption key and encapsulates the outgoing encrypted inner tunnel packets with a wrapper that includes data elements representing one or more of: IP:port, service ID, connection ID, session ID, application ID, and/or additional parameters defined by local policy. Typically, the wrapper protects a packet for at least one of privacy or integrity. The VPN endpoint (210) further encrypts the outgoing packets and wrappers using an outer tunnel VPN connection encryption key. The VPN endpoint defines a unique connection ID for each connection (VPN tunnel or stream) between the service and the ARS. The VPN endpoint concentrator, or in some configurations a stitcher component of the ARS, assigns a unique local service IP address to each connection through the VPN endpoint concentrator.

When the ARS receives a request for a particular service resource from client device (300), the ARS determines whether a VPN tunnel is currently in place from the requested service. If not, the ARS prompts the requested service to establish a VPN tunnel with the ARS. In another configuration, the ARS includes pre-configured VPN tunnel(s) to a predetermined service (200) and zero more additional predetermined services, which limits a client device to only accessing one of the predetermined service resources.

The ARS records information encoded in packet wrappers to a directory service and uses the information for internal routing of packets between applications and services. The client VPN concentrator or gateway component of the ARS, records one or more of the IP:port, application ID, connection ID, session ID information extracted from packets received from the client device to a directory service and associates the information with a local IP address. In a similar manner, the service VPN concentrator, or a stitcher component of the ARS extracts and records one or more of IP:port, service ID, connection ID, session ID data from packets received from the service, associated with a local IP address corresponding to the connection ID, to a directory service.

External processes provide operational advantages when operating with clusters of ARSs. The local client IP address is associated with a client VPN concentrator (e.g. 130b) or the IP address of a multiplexed VPN tunnel that corresponds to the particular application (e.g. 316a). Each local client IP address corresponds either to a particular application (e.g. 316b) for which client (300) has established a VPN tunnel or a multiplexed VPN tunnel to the client VPN concentrator. The local service IP address is associated with a service VPN concentrator (140b) connection that corresponds to a particular service (200) which has a VPN tunnel established to the service VPN concentrator.

4.3.2 Second Example System Architecture

Figure 4:
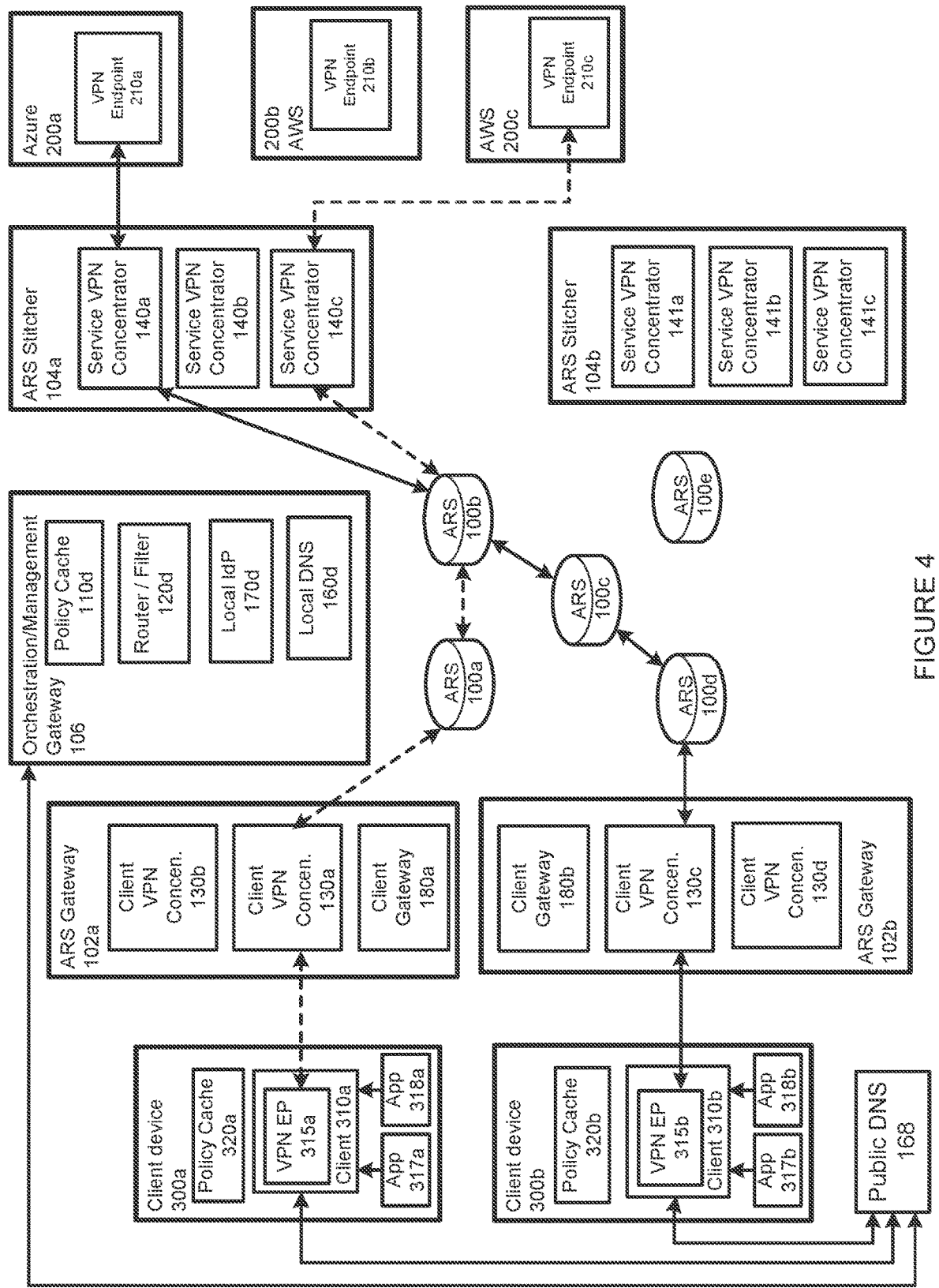
FIG. 4 illustrates a second example system architecture including a plurality of instances of an ARS.

FIG. 4 illustrates a second example configuration of a Universal Access System. The system as described illustrates additional features of the architecture, in that it includes multiple instances of a client-only facing server, called an ARS gateway (102a, 102b), and multiple instances of an enterprise service-only facing server called an ARS stitcher (104a, 104b). ARS gateways and ARS stitchers communicate between themselves over a network routing between multiple ARS instances (e.g. 100a, 100b, 100c, 100d, 100e) and/or Orchestration servers (106). The Universal Access System can include multiple geographically dispersed and redundant ARS gateways and multiple redundant ARS stitchers where the ARS gateways and ARS stitchers are located to be a short network distance from the client devices and services.

An orchestration server (106) is a variant of an ARS that includes partial functionality for routing, mediation, and inspection. The orchestration server comprises an optional policy cache (110d), an optional a router/filter component (120d), an optional local IdP (170d), an optional local DNS (160d), and optional mediation and inspection services (not shown). The orchestration server creates and stores, in public DNS (168), local DNS, or other directory service, one or more virtual IP addresses, corresponding to different ARS Gateways (e.g. 102a, 102b), endpoint services (e.g. 200a, 200b, 200c), and service resource of an endpoint service.

The orchestration server uses a router/filter component (120d) to determine routing of encrypted data packets between ARS Gateways (102a, 102b) and ARS stitchers (104a, 104b), e.g., between a first local client IP address and a first local service IP address. For example, the orchestration server determines that a data packet originating from a local client IP address corresponding to application-specific VPN tunnel for Application (318b) with a destination local service IP address corresponding to VPN tunnel for Azure endpoint (200a) should be routed to several various ARS (e.g. 100a, 100c, 100b) so it may be processed by the mediation and inspections services executing on those servers. In an exemplary implementation, the orchestration server builds a virtual routing path (illustrated by dashed lines indicating the routing in FIG. 5) between several servers (e.g. 100a-100e) and routes the session packets to policy-identified filters and policy elements, for example threat detection and data loss protection policy elements, over the virtual routing path. The orchestration server dynamically selects, optimizes, and updates the virtual routing path, for example to route around a slow or offline server, and dynamically select and apply filtering policy elements to the virtual routing path, and stores the completed routing information as a policy for subsequent use.

Mediation and inspection services are an extensible set of stand-alone services (programs) that operate on an ARS. Session packet traffic may be routed to one or more of these services as specified by policy. These services provide specific functions to the ARS. Anticipated services include:

Firewall—inspects and blocks specific types of network packets

Data filtering—inspects and blocks specific data types (e.g. file types)

Packet inspection—blocks/alters packets based upon packet content, includes API/JSON decoding.

Content inspection—scans content for specific content or content requests (optionally blocks or alerts on that content).

Data Loss Prevention (DLP)—scans content for specific blocked content (optionally blocks or alerts on that content).

Mediation and inspection services are parameterized by one or more policy elements that define the inspection and filtering parameters.

4.3.3 Third Example System Architecture

FIG. 5 illustrates a third example configuration of a Universal Access System that demonstrates still more features of the system. The system includes an ARS (100) in communication with multiple client devices (300a, 300b), a common policy store (400), and with multiple enterprise services. Enterprise services include Infrastructure as a Service (IaaS) platforms such as Microsoft Azure (200a), a first AWS service (200b), a second AWS service (200c), and Software as a Service (SaaS) service (200d), such as Microsoft Office365, as well as services within an enterprise data center (500). Each of the enterprise services Azure, first AWS, second AWS, and data center services includes or is associated with one or more VPN endpoints (210a, 210b, 210c, 210d) which establishes one or more outbound VPN tunnels with a service VPN concentrator (140a, 140b, 140c, or 140d) of the ARS (100).

The client devices connect to an ARS as previously described. Similarly, Service VPN concentrator (140) comprises one or more service VPN concentrators (140a, 140b, 140c, 140d), each of which is an endpoint with one or more service VPN endpoint (210a, 210b, 210c, 210d).

SaaS (200d) is connected to the ARS over a non-VPN tunnel connection via network service interface (145). In an optional configuration, a cloud access security broker (CASB) (700) is interposed between the ARS and the SaaS (200d). The CASB provides policy-controlled access to the SaaS. The CASB retrieves policy elements from policy cache (110) and is configured with policy-based access policy elements by orchestration API (185).

In an optional configuration, client (310a) routes traffic from one or more applications (e.g. 317a) directly to and from SaaS (200d) over a direct non-VPN connection (312a), thereby bypassing ARS (100). The client does not encrypt directly routed packets, i.e. packets that are not routed to an endpoint with a publisher-specific encryption key since a key has not been negotiated.

In addition to the above described routing, the system supports a bypass mechanism in which the client (310b) uses VPN endpoint (315b) to establish a direct VPN tunnel (312b) with VPN endpoint associated with enterprise data center (500) and routes traffic to and from one or more apps over the VPN tunnel, thereby bypassing ARS (100). This allows the system to work with legacy VPN-based systems.

ARS (100) is similar in structure and function to ARSs (100a, 100b, and 100c) with additional components and features enumerated. ARS (100) includes client gateway component (180) which interacts with one or more client VPN concentrators (130a, 130b).

Orchestration API (185) creates policy elements that are used by a router/filter component (120) to make session allowance decisions. The orchestration API retrieves applicable policy elements from the policy cache (110) and configures session allowance policy elements based at least in part on at least one policy element being identified as corresponding to the particular endpoint. The orchestration API retrieves device, user, and application related information from local IdP (170) and configures session allowance policy elements based at least in part on retrieved information. An exemplary session allowance policy element includes granting a particular user access to a particular resource, for example to Azure service (200b), if the user requests access using a particular application (e.g. application (317b) comprising a web browser) from a particular device (e.g. client device (300b)). The exemplary session allowance policy element further specifies a known device UUID of client device (300b) that must be matched as well as a known certificate associated with application (317b) that must be matched to allow a session.

4.3.3.1 Client Requesting Access to Service

Figure 6A:
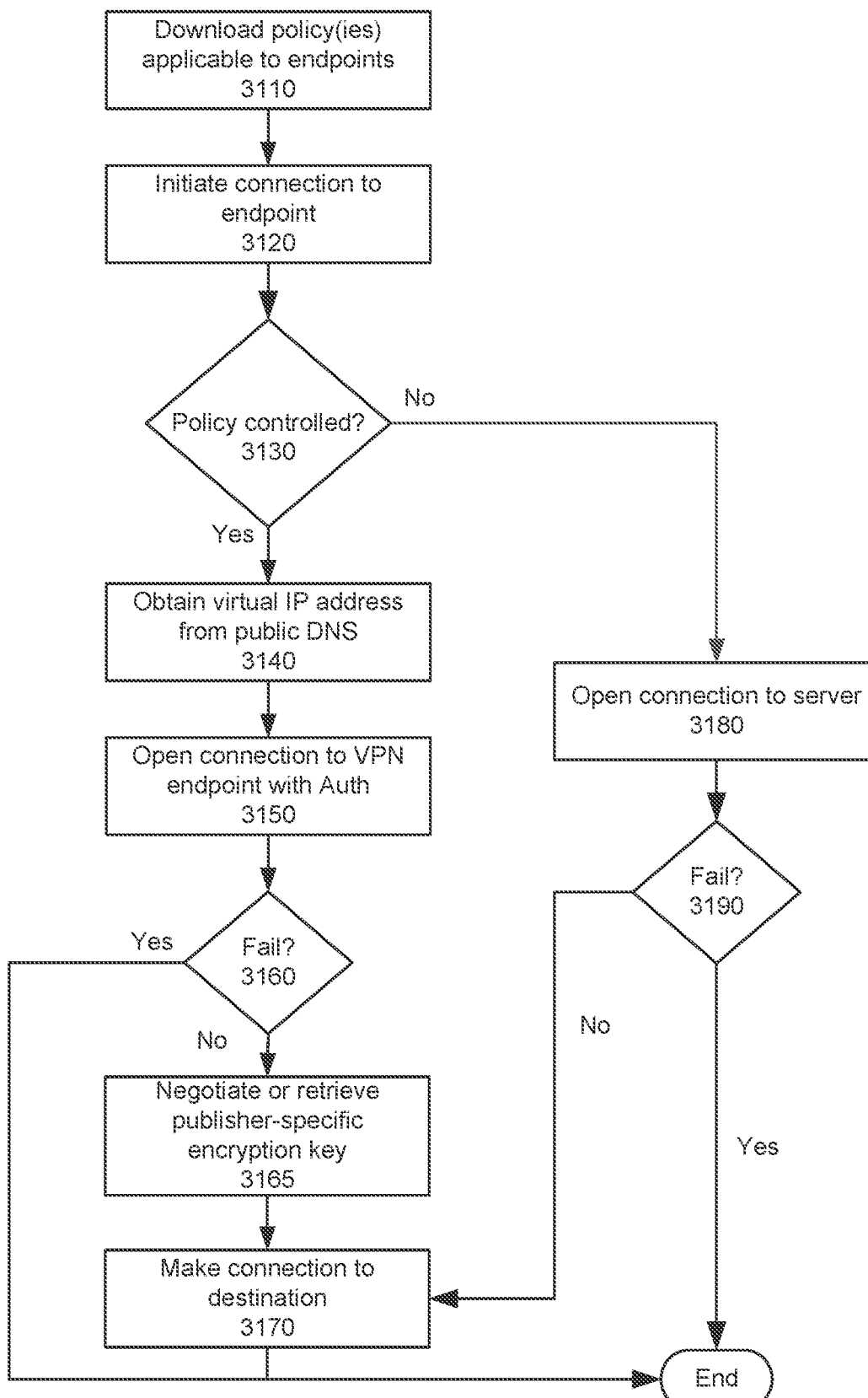
FIGS. 6A and 6B illustrate an example process flow that occurs when a client requests access to a service.
Figure 6B:
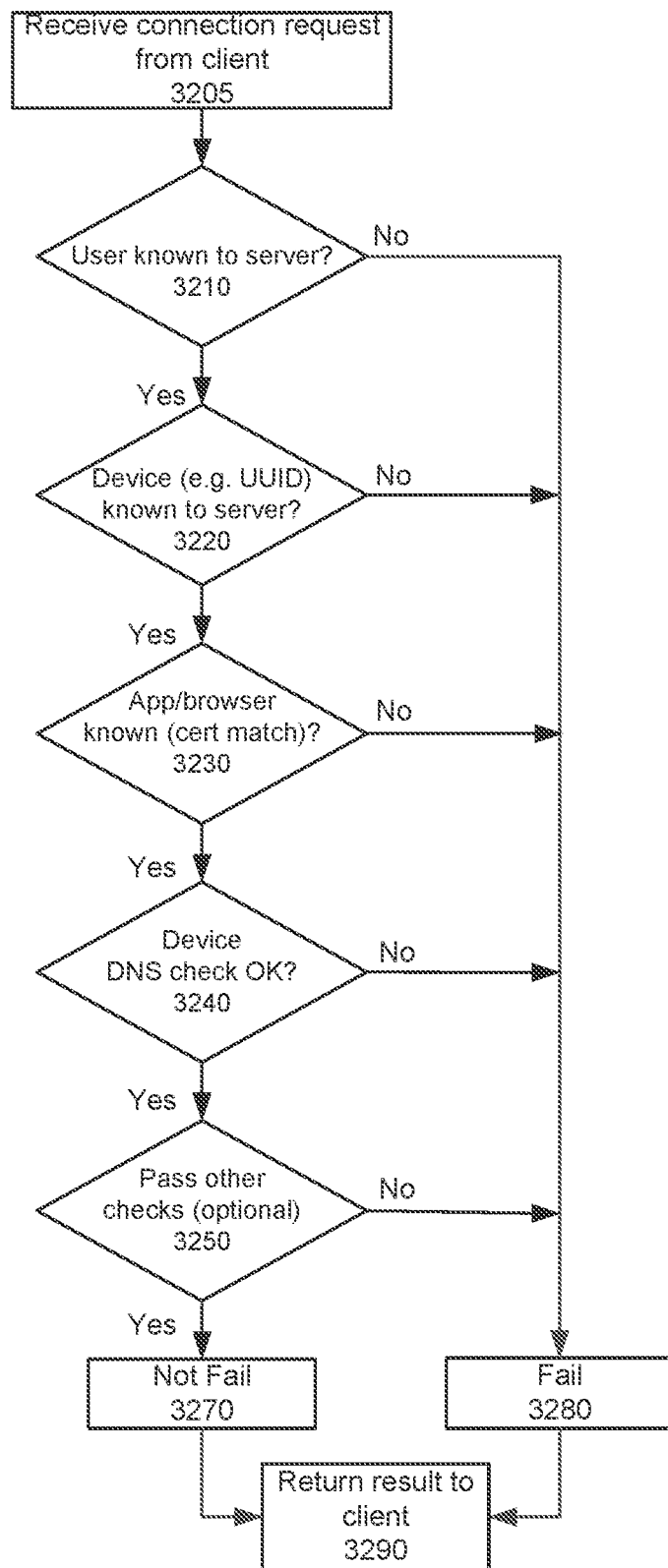

FIGS. 6A and 6B illustrate an example flow that occurs when a client, e.g., client 310a, requests access to a service, for example when a user accesses an application (e.g. 317a), for example a web browser, and uses the application to request access to a service, for example by entering login information and a service resource access request, for example a request to a first AWS VPC resource (200b), into an interface displayed on the web browser.

At step (3110), the client (e.g. 310a) downloads, from policy cache (320a), one or more policies for the requested service, for example an access control policy that specifies user identities that are allowed to access the service or a policy that identifies the enterprise services for which network packet traffic should be routed via an ARS and a data encryption policy that specifies that clients (e.g. 310a) that are allowed to access the service are required to negotiate a publisher-specific encryption key with the service and use the key to encrypt data packets sent to the service. Alternatively, the policy defines a directory service that is authoritative for the list of enterprise services and their routings. If the policy cache does not contain policy information for the requested service, the client causes the policy cache to determine whether the policy is present on the policy store (400) and, if so, to download updated policy information to the policy cache.

The client then initiates connection to the service endpoint at step (3120) by determining whether access to the service is controlled by one or more policy elements (3130). If access to the requested service is controlled by the one or more policy elements, the client, at step (3140) obtains, from public DNS (168), virtual IP address information corresponding to a connection provided by VPN concentrator (e.g. 130a), or more generally to the ARS (100).

At step (3150), the client application uses the client's VPN endpoint (315a) to attempt to open a VPN tunnel to the client VPN concentrator (e.g., 130a). The client's VPN endpoint interacts with client VPN concentrator in order to perform authentication and authorization of the user, device, and application. The authentication performed by the client VPN concentrator (e.g., 130a) is described in further detail below in relation to FIG. 6B. If authentication fails (3160), the process ends without a VPN connection being created. If authentication is successful (3160), client VPN concentrator (130a) opens the requested VPN tunnel.

At step (3165), the client negotiates a publisher-specific encryption key with a publisher component of the service. In alternative implementations, the client retrieves a publisher-specific encryption key from policy or from a directory of the ARS.

At step (3170), the application creates a session and connection to the requested service via the VPN tunnel and the ARS. Otherwise, the process ends without the client establishing a connection with the ARS.

If, at step (3130), the client (e.g., client (310a)) determines that connection and/or session to the requested endpoint is not controlled by policy, the client attempts to open a non-VPN connection to the ARS at step (3180) and, if the connection attempt is successful, the application, at step (3190) makes a session to the requested service over the non-VPN connection and the ARS. Otherwise, the process ends without the client establishing a connection with the ARS.

4.3.3.2 ARS Authenticating User, Device, and Application

FIG. 6B illustrates user, device, and application authentication steps carried out by ARS (100). The authentication steps are carried out by client gateway (180*a*) and client VPN concentrator (130*a*) when client (310*a*) requests, at step (3150) of FIG. 6A, that the ARS establish an outbound VPN tunnel from the client device to the ARS to enable one or more application (e.g. 317*a*, 318*a*) to access an enterprise service.

The process starts, at step (3205), when client VPN concentrator (e.g. 130*a*) receives a VPN connection request from a client. The client VPN concentrator determines, at step (3210) whether the user and/or device is known to the ARS on the basis of information provided by the client. At step (3220), the client VPN concentrator determines whether or not the device is known to the ARS.

At step (3230) the client VPN concentrator determines whether the application is known to the ARS, for example by querying the policy to determine if the application is on a list of applications approved for access to the ARS. In some configurations the application, for example a web browser application, is associated with a certificate and the client VPN concentrator determines whether the certificate matches a certificate that was previously known by the system to be associated with the application. In a particular configuration, the local IdP stores a copy of a certificate associated with each web browser application that is allowed to access the ARS and step (3230) includes determining whether a certificate presented by an application requesting access to the ARS matches a stored copy of a certificate that was previously associated with the browser.

At step (3240) the client VPN concentrator performs a DNS check to determine whether the device's URL matches a domain from which access to the ARS is permitted. At step (3250), in some configurations the client VPN concentrator performs additional checks, for example device health checks including determining whether the device has approved malware prevention software installed and whether the software's malware database is up to date.

If any of the checks (3210 through 3250) fail, the client VPN concentrator determines that the user, client, and or device has failed authentication (3280) and returns the fail result to the client (3290). If the authentication is successful, the client VPN concentrator, at step (3270), determines that authentication has not failed and returns the not fail result to the client (3290).

4.3.3.3 Session Between Application and Endpoint Service

Figure 7:
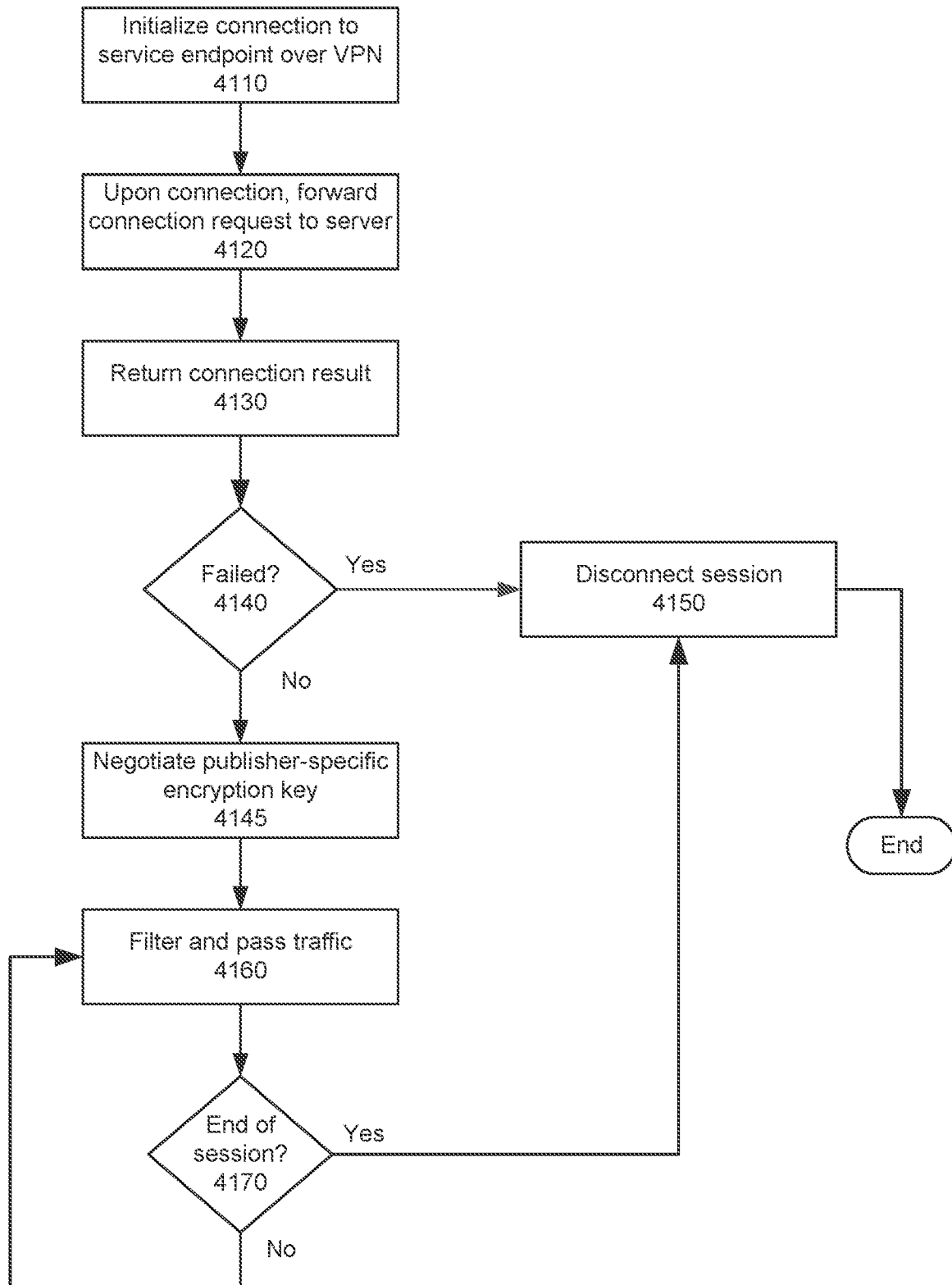
FIG. 7 illustrates an exemplary process flow carried out by an ARS to process a request, from an application, for establishing a session connection between the application and a service endpoint.

FIG. 7 illustrates an exemplary process flow carried out by an ARS to process a request, from an application (e.g., 317*a*), for establishing a session between the application and a service endpoint (e.g. 200*b*). The illustrated process flow occurs after a VPN tunnel has been established from a client device VPN endpoint (e.g. 315*a*) to a client VPN concentrator (e.g. 130*a*), as illustrated in FIGS. 6A and 6B.

At step (4110) the client device (e.g., 310*a*) initializes a session request, over the VPN tunnel, to a service endpoint by forwarding (4120) the connection request to the client VPN concentrator (e.g., 130*a*). Once the client device is validated, the process proceeds. If the client device cannot be validated, the connection request is denied and the connection dropped (step 4150).

At step (4130), the client gateway (180) determines whether a session between the requesting application and target service endpoint should be allowed. The client gateway component loads policy elements associated with the service endpoint from policy cache (110) and determines whether or not, according to the selected policy element(s), the user, device, and application are allowed to access the requested service. If access is not allowed according to policy, the client gateway component returns a failed session and/or connection result (4140) and the client VPN concentrator disconnects the session (4150) after which the process ends.

If the client gateway component determines that the application is allowed to connect to the endpoint service (i.e. connection result not failed (4140)), a publisher component of the endpoint service (e.g. 200*b*) negotiates a publisher-specific encryption key with the client (e.g., 310*a*) at step (4145) and the client VPN concentrator passes traffic from the application, encrypted with the publisher-specific encryption key, to and from the service endpoint at step (4160). In alternative implementations, the client retrieves a publisher-specific encryption key from a policy cache or from a directory on the ARS. The client VPN concentrator passes traffic to the router/filter component by determining packet destinations and forwarding packets to their destinations. The client gateway then changes the destination address of the packet to the local service IP address of the destination service.

Over the course of a session, the ARS filters packets while passing traffic between endpoints. For example, the router/filter component applies filtering policy elements to packets received from client VPN concentrator (130*a*) including, for example, policy specified filtering policy elements and other filtering policy elements such as nonce-based, time-based, and location-based filtering policy elements. In one example configuration, the router/filter retrieves packet filtering policy elements encoded as service policy elements from the policy cache (110). In an alternative example configuration, the router/filter component receives routing and filtering information from orchestration API (185).

The client VPN endpoint, client VPN concentrator, and the ARS router/filter continues to pass traffic between the application and service endpoint until the session ends (4170), at which point the client VPN concentrator disconnects the session (4150) and the process ends.

4.4 Conclusions

It will also be recognized by those skilled in the art that, while the technology has been described above in terms of preferred embodiments, it is not limited thereto. Various features and aspects of the above described technology may be used individually or jointly. Further, although the technology has been described in the context of its implementation in a particular environment, and for particular applications, those skilled in the art will recognize that its usefulness is not limited thereto and that the present technology can be beneficially utilized in any number of environments and. Accordingly, the claims set forth below should be construed in view of the full breadth and spirit of the technology as disclosed herein.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed:

1. A system to provide policy-controlled communication over the Internet between a plurality of remote services and a plurality of third party applications executing on a client device, the system comprising one or more processors and one or more memories with code for:
   a client endpoint function that executes on the client device while coupled to a first VPN tunnel, the client endpoint function comprising:
      a first policy component, enforcing a plurality of policies on network packet traffic for a plurality of applications, wherein the plurality of policies specify one or more aspects of processing of network sessions from a third party application to a remote service,
      an first interceptor component that identifies network packet traffic and network sessions compliant with the plurality of policies, and
      a first VPN endpoint component, which provides a connection to a mid-link server using a first VPN tunnel programmed according to the plurality of policies,
   a service endpoint function that operates a remote service of the plurality of remote services, the service endpoint function at a service location, the service endpoint function comprising:
      a second interceptor component that identifies network packet traffic using the plurality of policies, and
      a second VPN endpoint component that connects to the mid-link server using a second VPN tunnel programmed according to the plurality of policies, and
   a mid-link server, coupled to the first VPN tunnel and the second VPN tunnel, the mid-link server comprising:
      a first and second VPN termination point that authenticates and terminates the first and second VPN tunnels at a mid-link server,
      a second policy component, wherein the second policy component uses the plurality of policies to specify at least: policy-based routing, packet re-addressing, and content mediation rules on packet traffic arriving from the first VPN tunnel,
      a router component interposed between the first and second VPN tunnels, wherein the router component operates to route network packet traffic between the first and second VPN tunnels via a route specified by the plurality of policies,
      an inspection component that analyzes network packet traffic in accordance with the plurality of policies, and
      a mediation component, effective to mask network addresses of the client device and service devices from each other, wherein the third party application operates with the remote service to provide functionality to the client device,
      wherein the inspection component inspects the network packet traffic for specific content and provides instructions to at least one of the router component or the mediation component, and the instructions are a function of at least one policy of the plurality of policies that applies to the specific content.

2. The system to provide policy-controlled communication over the Internet between the plurality of remote services and the plurality of third party applications executing on the client device as recited in claim 1, wherein the mid-link server comprises an Access Resource Server (ARS) that includes the inspection component.

3. The system to provide policy-controlled communication over the Internet between the plurality of remote services and the plurality of third party applications executing on the client device as recited in claim 1, wherein the inspection component is a data loss prevention (DLP) component.

4. The system to provide policy-controlled communication over the Internet between the plurality of remote services and the plurality of third party applications executing on the client device as recited in claim 1, wherein the router component routes connection network packet traffic through the inspection component.

5. The system to provide policy-controlled communication over the Internet between the plurality of remote services and the plurality of third party applications executing on the client device as recited in claim 1, wherein the at least one policy of the plurality of policies is selected as a function of at least one of a user, an application, an endpoint, or a session.

6. The system to provide policy-controlled communication over the Internet between the plurality of remote services and the plurality of third party applications executing on the client device as recited in claim 1, wherein the inspection component inspects the network traffic for at least one of packet filtering, threat detection, deep packet inspection, or data loss prevention (DLP).

7. The system to provide policy-controlled communication over the Internet between the plurality of remote services and the plurality of third party applications executing on the client device as recited in claim 1, wherein the inspection component inspects the network traffic for specific blocked content.

8. The system to provide policy-controlled communication over the Internet between the plurality of remote services and the plurality of third party applications executing on the client device as recited in claim 7, wherein upon identifying the specific blocked content, the inspection component blocks the specific blocked content.

9. The system to provide policy-controlled communication over the Internet between the plurality of remote services and the plurality of third party applications executing on the client device as recited in claim 1, wherein the first VPN tunnel comprises a plurality of physical VPN tunnels to differing client gateway components.

10. The system to provide policy-controlled communication over the Internet between the plurality of remote services and the plurality of third party applications executing on the client device as recited in claim 1, wherein the second VPN tunnel comprises a plurality of physical VPN tunnels to differing service VPN concentrators.

11. The system to provide policy-controlled communication over the Internet between the plurality of remote services and the plurality of third party applications executing on the client device as recited in claim 1, wherein the plurality of third party applications have their network traffic redirected to the first VPN tunnel.

12. The system to provide policy-controlled communication over the Internet between the plurality of remote services and the plurality of third party applications executing on the client device as recited in claim 1, wherein domain name service (DNS) is used to redirect network packet traffic of the third party application to the mid-link server.

13. The system to provide policy-controlled communication over the Internet between the plurality of remote services and the plurality of third party applications executing on the client device as recited in claim 1, wherein the first VPN tunnel is built into an operating system for the client device.

14. The system to provide policy-controlled communication over the Internet between the plurality of remote services and the plurality of third party applications executing on the client device as recited in claim 1, wherein an address service endpoint is a non-routable IP address.

15. The system to provide policy-controlled communication over the Internet between the plurality of remote services and the plurality of third party applications executing on the client device as recited in claim 1, wherein the first interceptor component traps network packet traffic on the client device.

16. The system to provide policy-controlled communication over the Internet between the plurality of remote services and the plurality of third party applications executing on the client device as recited in claim 1, wherein a first connection over the first VPN tunnel is encrypted between the client endpoint function and the mid-link server.

17. The system to provide policy-controlled communication over the Internet between the plurality of remote services and the plurality of third party applications executing on the client device as recited in claim 1, wherein a second connection over the second VPN tunnel is encrypted between the mid-link server and the service endpoint function.

18. The system to provide policy-controlled communication over the Internet between the plurality of remote services and the plurality of third party applications executing on the client device as recited in claim 1, wherein the mid-link server comprises a firewall interposed into network packet flow between the first and second VPN tunnels.

19. The system to provide policy-controlled communication over the Internet between the plurality of remote services and the plurality of third party applications executing on the client device as recited in claim 1, wherein the network packet traffic between client devices and the remote service is dual encrypted, with a first encryption being applied to network data packets for the client device to service session, and a second encryption applied for transport over a VPN tunnel.

20. The system to provide policy-controlled communication over the Internet between the plurality of remote services and the plurality of third party applications executing on the client device as recited in claim 1, wherein the plurality of policies includes a policy specifying what encryption to use on one or both of the first and second VPN tunnels.

* * * * *